United States Patent
Sodenaga

(10) Patent No.: US 11,222,226 B2
(45) Date of Patent: Jan. 11, 2022

(54) MONITORING-SCREEN-DATA GENERATION DEVICE, MONITORING-SCREEN-DATA GENERATION METHOD, AND RECORDING MEDIUM

(71) Applicant: Mitsubishi Electric Corporation, Tokyo (JP)

(72) Inventor: Shingo Sodenaga, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 77 days.

(21) Appl. No.: 16/493,463

(22) PCT Filed: Mar. 21, 2017

(86) PCT No.: PCT/JP2017/011261
§ 371 (c)(1),
(2) Date: Sep. 12, 2019

(87) PCT Pub. No.: WO2018/173126
PCT Pub. Date: Sep. 27, 2018

(65) Prior Publication Data
US 2020/0134353 A1    Apr. 30, 2020

(51) Int. Cl.
*G06K 9/32* (2006.01)
*G06K 9/20* (2006.01)
*G06K 9/00* (2006.01)

(52) U.S. Cl.
CPC ....... *G06K 9/3241* (2013.01); *G06K 9/00201* (2013.01); *G06K 9/2054* (2013.01); *G06K 9/3216* (2013.01)

(58) Field of Classification Search
CPC combination set(s) only.
See application file for complete search history.

(56) References Cited

U.S. PATENT DOCUMENTS

2005/0206726 A1* 9/2005 Yoshida ................. H04N 7/181
  348/143
2013/0004087 A1* 1/2013 Kumar ................ G06F 11/3688
  382/218

(Continued)

FOREIGN PATENT DOCUMENTS

| CN | 104656605 B | 5/2015 |
| JP | S63273914 A | 11/1988 |

(Continued)

OTHER PUBLICATIONS

International Search Report (PCT/ISA/210) dated Jun. 27, 2017, by the Japan Patent Office as the International Searching Authority for International Application No. PCT/JP2017/011261.

*Primary Examiner* — Tsung Yin Tsai
(74) *Attorney, Agent, or Firm* — Buchanan Ingersoll & Rooney PC

(57) ABSTRACT

A monitoring-screen-data generation device includes an object-data generation unit, a screen-data generation unit, and an assignment processing unit. The object-data generation unit identifies a plurality of objects included in an image based on image data, and generates object data. The screen-data generation unit generates monitoring screen data on the basis of the object data. On the basis of definition data that defines a state transition and the object data, the assignment processing unit assigns data that defines the state transition to an image object included in a monitoring screen of the monitoring screen data.

10 Claims, 27 Drawing Sheets

(56) References Cited

U.S. PATENT DOCUMENTS

| | | | | |
|---|---|---|---|---|
| 2013/0132000 A1* | 5/2013 | Tamaki | ............... | G06F 17/00 |
| | | | | 702/35 |
| 2014/0189576 A1* | 7/2014 | Carmi | ............... | G06K 9/6204 |
| | | | | 715/781 |
| 2014/0218385 A1* | 8/2014 | Carmi | ............... | G06T 7/136 |
| | | | | 345/590 |
| 2014/0223323 A1* | 8/2014 | Kasahara | ............... | G06F 21/36 |
| | | | | 715/740 |
| 2014/0237455 A1* | 8/2014 | Koneru | ............... | G06F 3/0482 |
| | | | | 717/131 |
| 2015/0023650 A1* | 1/2015 | Austin | ............... | G11B 27/30 |
| | | | | 386/241 |
| 2016/0239680 A1* | 8/2016 | Holz | ............... | G06F 21/6245 |
| 2019/0026955 A1* | 1/2019 | Ogata | ............... | G06T 19/00 |

FOREIGN PATENT DOCUMENTS

| | | | |
|---|---|---|---|
| JP | 2005346432 | A | 12/2005 |
| JP | 2009175969 | A | 8/2009 |
| JP | 2012174128 | A | 9/2012 |
| JP | 2013125424 | A | 6/2013 |

\* cited by examiner

| TYPE | COORDINATES | SIZE |
|---|---|---|
| SOLENOID VALVE 1 | 50,25 | 10×10 |
| SOLENOID VALVE 2 | 240,25 | 10×10 |
| RIGHT-SIDE OUTLET PUMP 1 | 120,25 | 8×8 |
| NUMERICAL-VALUE BUTTON 1 | 120,35 | 15×8 |
| RIGHT-SIDE OUTLET PUMP 2 | 120,175 | 8×8 |
| NUMERICAL-VALUE BUTTON 2 | 120,185 | 15×8 |
| ⋮ | ⋮ | ⋮ |

FIG.6

| CHARACTER STRING | COORDINATES | SIZE |
|---|---|---|
| FIRST WATER PURIFICATION PLANT | 5,5 | 18 |
| FIRST WATER PIPE VALVE | 50,15 | 12 |
| SECOND WATER PIPE VALVE | 240,15 | 12 |
| FIRST WATER PUMP | 120,25 | 12 |
| SECOND WATER PUMP | 120,165 | 12 |
| FIRST RESERVOIR | 5,20 | 14 |

| SYMBOL TYPE | DEVICE NAME | COORDINATES | SIZE |
|---|---|---|---|
| SOLENOID VALVE 1 | FIRST WATER PIPE VALVE | 50,25 | 10×10 |
| SOLENOID VALVE 2 | SECOND WATER PIPE VALVE | 240,25 | 10×10 |
| RIGHT-SIDE OUTLET PUMP 1 | FIRST WATER PUMP | 120,25 | 8×8 |
| NUMERICAL-VALUE BUTTON 1 | FIRST WATER PUMP | 120,35 | 15×8 |
| RIGHT-SIDE OUTLET PUMP 2 | SECOND WATER PUMP | 120,175 | 8×8 |
| NUMERICAL-VALUE BUTTON 2 | FIRST WATER PUMP | 120,185 | 15×8 |

(43)

| SYMBOL TYPE | SYMBOL IMAGE |
|---|---|
| SOLENOID VALVE |  |
| RIGHT-SIDE OUTLET PUMP |  |
| ⋮ | ⋮ |

FIG.10

| DEVICE NAME | BEHAVIOR | SIGNAL NAME | SIGNAL CODE |
|---|---|---|---|
| FIRST WATER PIPE VALVE | BEHAVIOR 1 | ON | D11 |
|  | BEHAVIOR 2 | FAULT | D12 |
| SECOND WATER PIPE VALVE | BEHAVIOR 3 | ON | D13 |
|  | BEHAVIOR 4 | FAULT | D14 |
| FIRST WATER PUMP | BEHAVIOR 5 | ON | D15 |
|  | BEHAVIOR 6 | FLOW RATE | D16 |
| SECOND WATER PUMP | BEHAVIOR 7 | ON | D17 |
|  | BEHAVIOR 8 | FLOW RATE | D18 |
| ⋮ | ⋮ | ⋮ | ⋮ |

| SYMBOL TYPE | BEHAVIOR | SIGNAL CODE |
|---|---|---|
| SOLENOID VALVE 1 | BEHAVIOR 1 | D11 |
|  | BEHAVIOR 2 | D12 |
| SOLENOID VALVE 2 | BEHAVIOR 3 | D13 |
|  | BEHAVIOR 4 | D14 |
| RIGHT-SIDE OUTLET PUMP 1 | BEHAVIOR 5 | D15 |
|  | BEHAVIOR 6 | D16 |
| RIGHT-SIDE OUTLET PUMP 2 | BEHAVIOR 7 | D17 |
|  | BEHAVIOR 8 | D18 |
| ⋮ | ⋮ | ⋮ |

SCALING-FACTOR SETTING SCREEN — 62

SYMBOL COMPONENT

| Component | Value | Ref |
|---|---|---|
| SOLENOID VALVE 1 | 100% | 63a |
| SOLENOID VALVE 2 | 100% | 63b |
| RIGHT-SIDE OUTLET PUMP 1 | 100% | 63c |
| NUMERICAL-VALUE BUTTON 1 | 100% | 63d |
| RIGHT-SIDE OUTLET PUMP 2 | 100% | 63e |
| NUMERICAL-VALUE BUTTON 2 | 100% | 63f |

CHARACTER STRING

| Component | Value | Ref |
|---|---|---|
| FIRST WATER PURIFICATION PLANT | 100% | 65a |
| FIRST WATER PIPE VALVE | 100% | 65b |
| SECOND WATER PIPE VALVE | 100% | 65c |
| FIRST WATER PUMP | 100% | 65d |
| SECOND WATER PUMP | 100% | 65e |
| FIRST RESERVOIR | 100% | 65f |

LINE COMPONENT

| Component | Value | Ref |
|---|---|---|
| LINE COMPONENT 1 | 100% | 64a |
| LINE COMPONENT 2 | 100% | 64b |
| LINE COMPONENT 3 | 100% | 64c |
| LINE COMPONENT 4 | 100% | 64d |
| LINE COMPONENT 5 | 100% | 64e |

COLLECTIVE SETTING  100%  — 66

SETTING BUTTON — 67

CANCEL BUTTON — 68

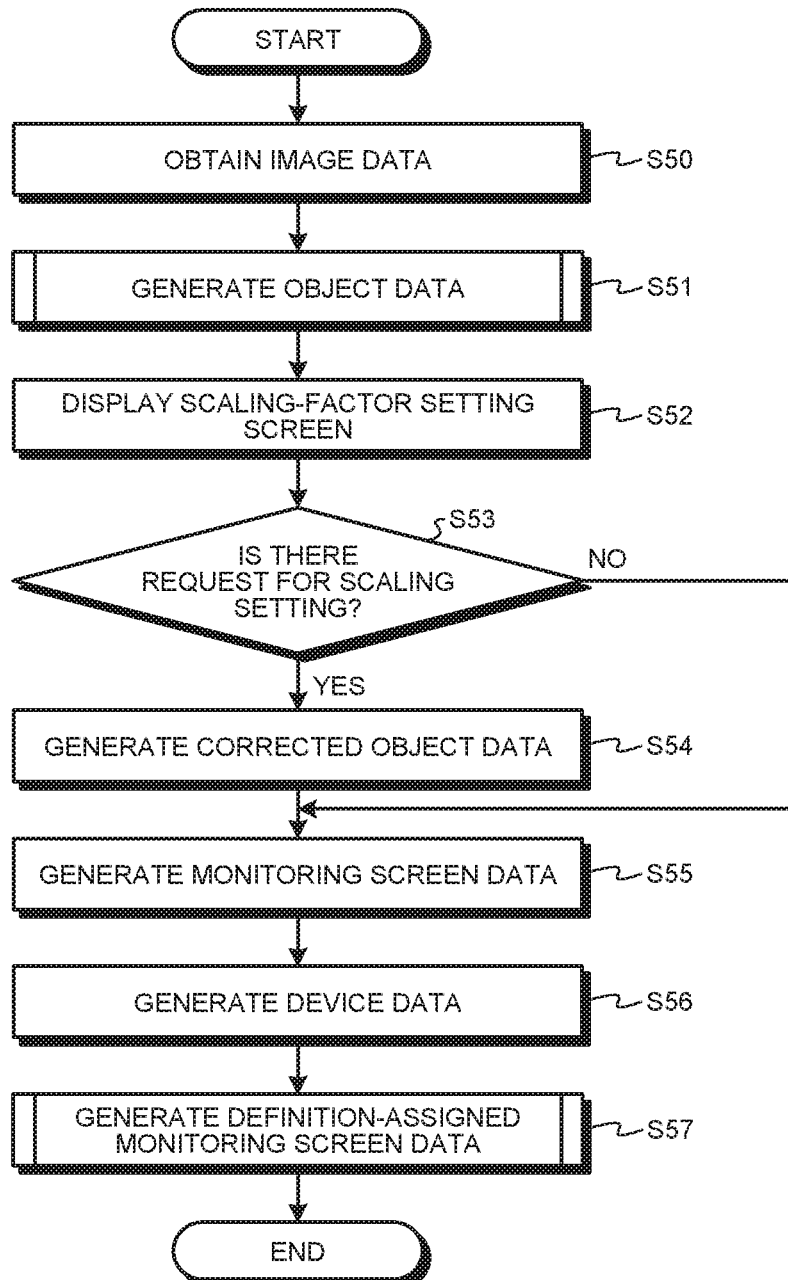

FIG.20

| SYMBOL TYPE | SIGNAL NAME | BEHAVIOR |
|---|---|---|
| SOLENOID VALVE | ON | BEHAVIOR 1 |
| | FAULT | BEHAVIOR 2 |
| PUMP | ON | BEHAVIOR 3 |
| | FLOW RATE | BEHAVIOR 4 |
| ⋮ | ⋮ | ⋮ |

FIG.21

| DEVICE NAME | SIGNAL NAME | SIGNAL CODE |
|---|---|---|
| FIRST WATER PIPE VALVE | ON | D11 |
| | FAULT | D12 |
| SECOND WATER PIPE VALVE | ON | D13 |
| | FAULT | D14 |
| FIRST WATER PUMP | ON | D15 |
| | FLOW RATE | D16 |
| SECOND WATER PUMP | ON | D17 |
| | FLOW RATE | D18 |
| ⋮ | ⋮ | ⋮ |

FIG.22

| DEVICE NAME | BEHAVIOR | SIGNAL NAME | SIGNAL CODE |
|---|---|---|---|
| FIRST WATER PIPE VALVE | BEHAVIOR 1 | ON | D11 |
| | BEHAVIOR 2 | FAULT | D12 |
| SECOND WATER PIPE VALVE | BEHAVIOR 1 | ON | D13 |
| | BEHAVIOR 2 | FAULT | D14 |
| FIRST WATER PUMP | BEHAVIOR 3 | ON | D15 |
| | BEHAVIOR 4 | FLOW RATE | D16 |
| SECOND WATER PUMP | BEHAVIOR 3 | ON | D17 |
| | BEHAVIOR 4 | FLOW RATE | D18 |
| ⋮ | ⋮ | ⋮ | ⋮ |

| SIGNAL NAME | BEHAVIOR |
|---|---|
| ON | BEHAVIOR 1 |
| FAULT | BEHAVIOR 2 |

MASK SETTING SCREEN — 69

SYMBOL COMPONENT      MASK
SOLENOID VALVE 1      ☐ ~73a
SOLENOID VALVE 2      ☐ ~73b
RIGHT-SIDE OUTLET PUMP 1  ☐ ~73c
NUMERICAL-VALUE BUTTON 1  ☐ ~73d
RIGHT-SIDE OUTLET PUMP 2  ☑ ~73e
NUMERICAL-VALUE BUTTON 2  ☑ ~73f

CHARACTER STRING      MASK
FIRST WATER PURIFICATION PLANT  ☐ ~75a
FIRST WATER PIPE VALVE          ☐ ~75b
SECOND WATER PIPE VALVE         ☐ ~75c
FIRST WATER PUMP                ☐ ~75d
SECOND WATER PUMP               ☐ ~75e
FIRST RESERVOIR                 ☐ ~75f

LINE COMPONENT
LINE COMPONENT 1  ☐ ~74a
LINE COMPONENT 2  ☐ ~74b
LINE COMPONENT 3  ☐ ~74c
LINE COMPONENT 4  ☐ ~74d
LINE COMPONENT 5  ☐ ~74e

SETTING BUTTON — 76
CANCEL BUTTON — 77

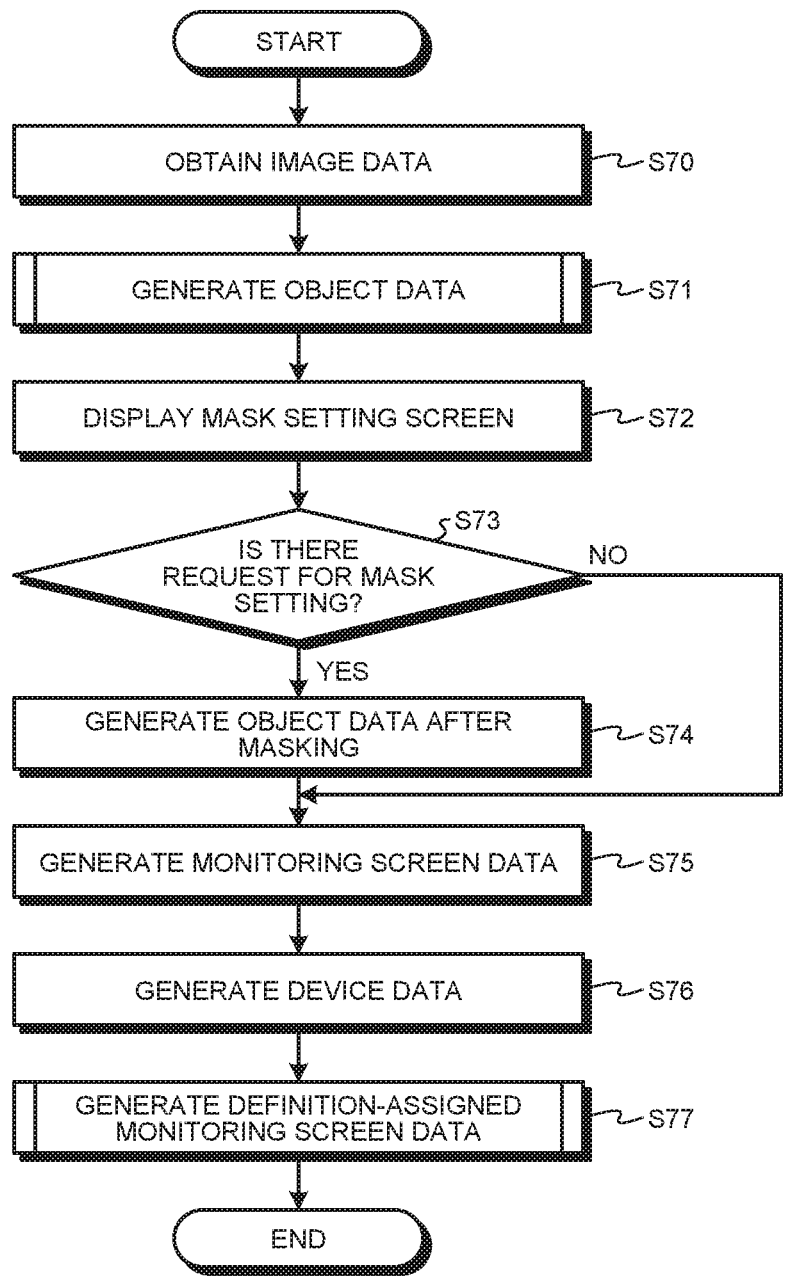

| CHARACTER STRING | COORDINATES | SIZE |
|---|---|---|
| FIRST WATER PURIFICATION PLANT | 5,5 | 18 |
| FIRST WATER PIPE VALVE | 50,15 | 12 |
| SECOND WATER PIPE VALVE | 240,15 | 12 |
| FIRST WATER PUMP | 120,25 | 12 |
| SECOND WATER PUMP | 120,165 | 12 |
| FIRST RESERVOIR | 5,20 | 14 |

42c

| CHARACTER STRING | COORDINATES | SIZE |
|---|---|---|
| FIRST WATER PURIFICATION PLANT | 5,5 | 18 |
| FIRST WATER PIPE VALVE | 50,15 | 12 |
| SECOND WATER PIPE VALVE | 240,15 | 12 |
| FIRST WATER PUMP | 120,25 | 12 |
| SECOND WATER PUMP | 120,165 | 12 |
| FIRST RESERVOIR | 5,20 | 14 |
| FIRST WATER PURIFICATION PLANT | <u>-185,5</u> | 18 |
| BASE END WATER PUMP | <u>-70,110</u> | 12 |
| FIRST RESERVOIR | <u>-185,20</u> | 14 |
| FIRST RESERVOIR | <u>-10,185</u> | 14 |

42b

| CHARACTER STRING | COORDINATES | SIZE |
|---|---|---|
| FIRST WATER PURIFICATION PLANT | 5,5 | 18 |
| FIRST WATER PIPE VALVE | 240,15 | 12 |
| BASE END WATER PUMP | 120,110 | 12 |
| FIRST RESERVOIR | 5,20 | 14 |
| FIRST RESERVOIR | 180,185 | 14 |

FIG.32

| SYMBOL TYPE | DEVICE NAME | COORDINATES | SIZE | 43a |
|---|---|---|---|---|
| SOLENOID VALVE 1 | FIRST WATER PIPE VALVE | 50,25 | 10×10 | |
| SOLENOID VALVE 2 | SECOND WATER PIPE VALVE | 240,25 | 10×10 | |
| RIGHT-SIDE OUTLET PUMP 1 | FIRST WATER PUMP | 120,25 | 8×8 | |
| NUMERICAL-VALUE BUTTON 1 | FIRST WATER PUMP | 120,35 | 15×8 | |
| RIGHT-SIDE OUTLET PUMP 2 | SECOND WATER PUMP | 120,175 | 8×8 | |
| NUMERICAL-VALUE BUTTON 2 | FIRST WATER PUMP | 120,185 | 15×8 | |

| SYMBOL TYPE | DEVICE NAME | COORDINATES | SIZE | 43c |
|---|---|---|---|---|
| SOLENOID VALVE 1 | FIRST WATER PIPE VALVE | 50,25 | 10×10 | |
| SOLENOID VALVE 2 | SECOND WATER PIPE VALVE | 240,25 | 10×10 | |
| RIGHT-SIDE OUTLET PUMP 1 | FIRST WATER PUMP | 120,25 | 8×8 | |
| NUMERICAL-VALUE BUTTON 1 | FIRST WATER PUMP | 120,35 | 15×8 | |
| RIGHT-SIDE OUTLET PUMP 2 | SECOND WATER PUMP | 120,175 | 8×8 | |
| NUMERICAL-VALUE BUTTON 2 | FIRST WATER PUMP | 120,185 | 15×8 | |
| RIGHT-SIDE OUTLET PUMP 1 | BASE END WATER PUMP | <u>-80,100</u> | 8×8 | |
| RESERVOIR | FIRST RESERVOIR | <u>-50,150</u> | 24×24 | |

| SYMBOL TYPE | DEVICE NAME | COORDINATES | SIZE | 43b |
|---|---|---|---|---|
| SOLENOID VALVE 1 | FIRST WATER PIPE VALVE | 240,25 | 10×10 | |
| RIGHT-SIDE OUTLET PUMP 1 | BASE END WATER PUMP | 110,100 | 8×8 | |
| RESERVOIR | FIRST RESERVOIR | 140,150 | 24×24 | |

FIG.33

| CHARACTER STRING | COORDINATES | SIZE |
|---|---|---|
| FIRST WATER PURIFICATION PLANT | 102.5,52.5 | 18 |
| FIRST WATER PIPE VALVE | 125,52.5 | 12 |
| SECOND WATER PIPE VALVE | 220,57.5 | 12 |
| FIRST WATER PUMP | 160,62.5 | 12 |
| SECOND WATER PUMP | 160,132.5 | 12 |
| FIRST RESERVOIR | 102.5,60 | 14 |
| FIRST WATER PURIFICATION PLANT | 7.5,52.5 | 18 |
| BASE END WATER PUMP | 65,105 | 12 |
| FIRST RESERVOIR | 7.5,60 | 14 |
| FIRST RESERVOIR | 95,142.5 | 14 |

FIG.34

| SYMBOL TYPE | DEVICE NAME | COORDINATES | SIZE |
|---|---|---|---|
| SOLENOID VALVE 1 | FIRST WATER PIPE VALVE | 125,62.5 | 5×5 |
| SOLENOID VALVE 2 | SECOND WATER PIPE VALVE | 220,62.5 | 5×5 |
| RIGHT-SIDE OUTLET PUMP 1 | FIRST WATER PUMP | 160,62.5 | 4×4 |
| NUMERICAL-VALUE BUTTON 1 | FIRST WATER PUMP | 160,67.5 | 7.5×4 |
| RIGHT-SIDE OUTLET PUMP 2 | SECOND WATER PUMP | 160,137.5 | 4×4 |
| NUMERICAL-VALUE BUTTON 2 | FIRST WATER PUMP | 160,142.5 | 7.5×4 |
| RIGHT-SIDE OUTLET PUMP 1 | BASE END WATER PUMP | 65,100 | 4×4 |
| RESERVOIR | FIRST RESERVOIR | -75,150 | 12×12 |

MONITORING-SCREEN-DATA GENERATION DEVICE, MONITORING-SCREEN-DATA GENERATION METHOD, AND RECORDING MEDIUM

FIELD

The present invention relates to a monitoring-screen-data generation device, a monitoring-screen-data generation method, and a recording medium to generate monitoring screen data.

BACKGROUND

A monitoring control system monitors and controls a plurality of devices provided in facilities. The monitoring control system displays a monitoring screen on a display device. On the monitoring screen, a plurality of image objects, including symbols that represent monitoring-target devices, are placed. On this monitoring screen, the symbol visually changes on the basis of the state of the monitoring-target device to indicate a state transition. This facilitates the monitoring.

Patent Literature 1 discloses a monitoring-screen-data generation device that generates monitoring screen data that is data of a monitoring screen. In the monitoring-screen-data generation device, monitoring screen data including an image object is generated from image data captured from outside.

CITATION LIST

Patent Literature

Patent Literature 1: Japanese Patent Application Laid-open No. 2012-174128

SUMMARY

Technical Problem

However, in the conventional monitoring-screen-data generation device, a system designer needs to manually assign data that defines a state transition to an image object. This requires a significant amount of time and effort to create monitoring screen data.

The present invention has been achieved to solve the above problems, and an object of the present invention is to provide a monitoring-screen-data generation device that can easily generate monitoring screen data in which data that defines a state transition is assigned to an image object indicating a monitoring-target device.

Solution to Problem

In order to solve the above problems and achieve the object, a monitoring-screen-data generation device according to an aspect of the present invention includes an image-data obtaining unit, an object-data generation unit, a screen-data generation unit, and an assignment processing unit. The image-data obtaining unit obtains image data that is data of an image. The object-data generation unit identifies a plurality of objects included in the image of the image data obtained by the image-data obtaining unit, and generates object data that includes information on the objects. The screen-data generation unit generates monitoring screen data on a basis of the object data generated by the object-data generation unit, the monitoring screen data being data of a monitoring screen including an image object that is an object of an image among the objects. On a basis of definition data that defines a state transition and the object data, the assignment processing unit assigns data that defines the state transition to the image object included in a monitoring screen of the monitoring screen data.

Advantageous Effects of Invention

According to the present invention, there is an effect where it is possible to easily generate monitoring screen data in which data that defines a state transition is assigned to an image object indicating a monitoring-target device.

BRIEF DESCRIPTION OF DRAWINGS

FIG. 6 is a diagram illustrating an example of character object data according to the first embodiment.

FIG. 7 is a diagram illustrating an example of device data according to the first embodiment.

FIG. 10 is a diagram illustrating an example of item definition data according to the first embodiment.

FIG. 11 is a diagram illustrating an example of assignment data according to the first embodiment.

FIG. 17 is a diagram illustrating an example of a scaling-factor setting screen displayed on a display device according to the second embodiment.

FIG. 18 is a flowchart illustrating an example of processing in a control unit according to the second embodiment.

FIG. 20 is a diagram illustrating an example of item template data according to the third embodiment.

FIG. 21 is a diagram illustrating an example of signal definition data according to the third embodiment.

FIG. 22 is a diagram illustrating an example of assignment data according to the third embodiment.

FIG. 23 is a diagram illustrating another example of the item template data according to the third embodiment.

FIG. 26 is a diagram illustrating an example of a mask setting screen displayed on a display device according to the fourth embodiment.

FIG. 27 is a flowchart illustrating an example of processing in a control unit according to the fourth embodiment.

FIG. 31 is an explanatory diagram illustrating merging of object data according to the fifth embodiment.

FIG. 32 is an explanatory diagram illustrating merging of the object data according to the fifth embodiment.

FIG. 33 is a diagram illustrating an example of character object data included in merged object data according to the fifth embodiment.

FIG. 34 is a diagram illustrating an example of device data included in the merged object data according to the fifth embodiment.

DESCRIPTION OF EMBODIMENTS

A monitoring-screen-data generation device, a monitoring-screen-data generation method, and a recording medium according to embodiments of the present invention will be described in detail below with reference to the accompanying drawings. The present invention is not limited to the embodiments.

First Embodiment

Figure 1:
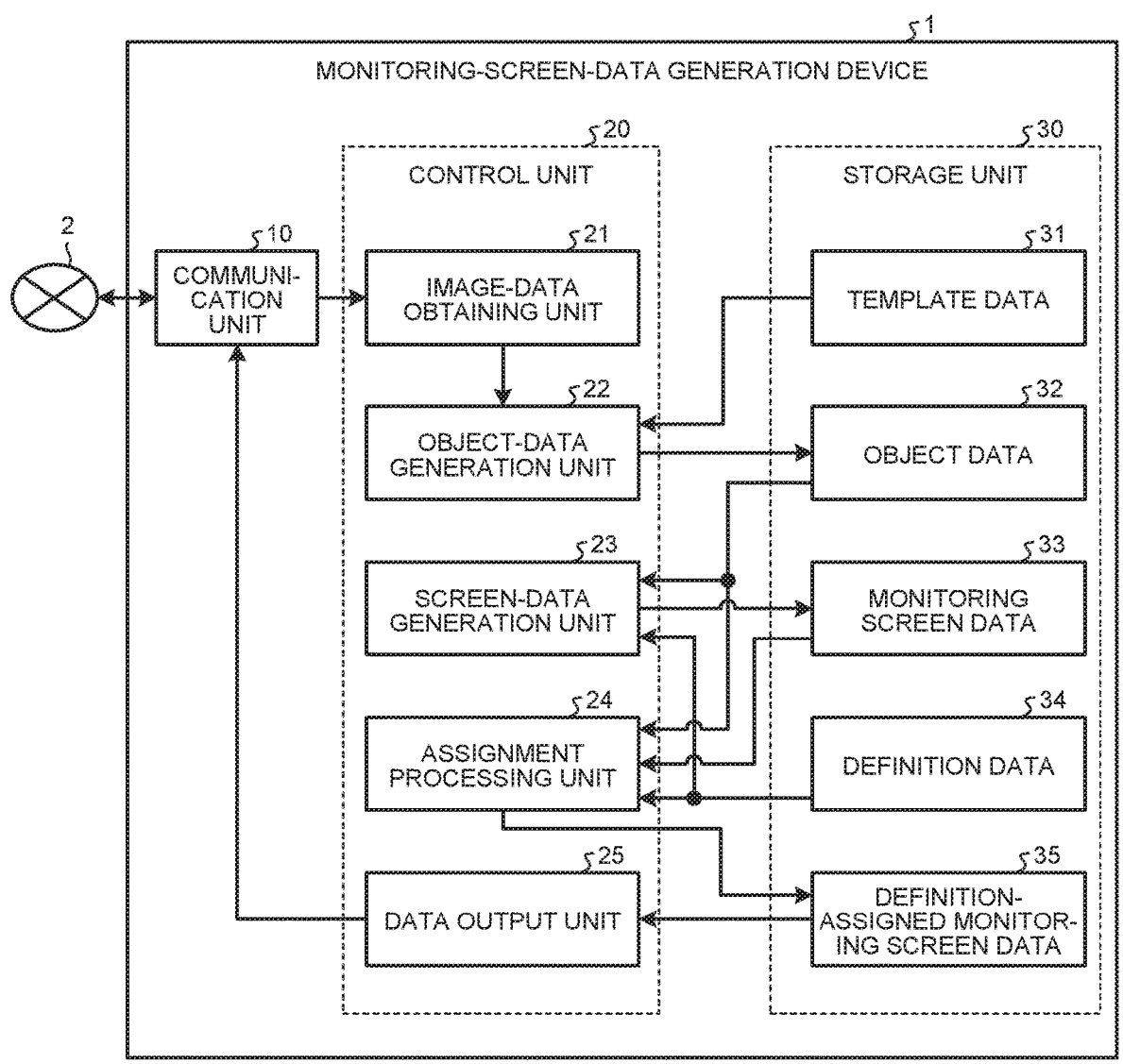
FIG. 1 is a diagram illustrating an example configuration of a monitoring-screen-data generation device according to a first embodiment.

FIG. 1 is a diagram illustrating an example configuration of a monitoring-screen-data generation device according to a first embodiment of the present invention. A monitoring-screen-data generation device 1 illustrated in FIG. 1 includes a communication unit 10, a control unit 20, and a storage unit 30. The monitoring-screen-data generation device 1 generates monitoring screen data that is data of a monitoring screen for monitoring a plurality of devices provided in facilities or a plant. Examples of the plant as a monitoring target include a water purification plant, a power plant, and a factory.

The monitoring-screen-data generation device 1 generates monitoring screen data that is data of a monitoring screen including a plurality of image objects. The image objects that constitute the monitoring screen include a symbol component indicating a monitoring-target device and a line component connecting the monitoring-target devices. In the following descriptions, the symbol component is sometimes referred to as "symbol".

In a monitoring control system that monitors and controls a plurality of devices provided in a plant, the monitoring screen data is information used for generating a screen to be displayed on a display device (not illustrated) in order to monitor and control each of the devices. This monitoring screen data includes data that defines a state transition assigned to an image object in addition to data of each object as described later.

The state transition described above includes at least one of a behavior of an image object in response to a signal received from a monitoring-target device and a behavior of an image object when an operation is performed on the image object. The behavior includes at least one of a change in condition of the image object and a display of a device operation screen.

The change in condition of the image object includes at least one of the changes in color, shape, and pattern of the image object. The change in condition of the image object also includes a change in numerical value displayed within the image object. The device operation screen is a screen used for operating a device that inputs or outputs a signal assigned to an image object.

The communication unit 10 transmits and receives information to and from other devices (not illustrated) through a network 2. While the network 2 is an intranet, it is allowable that the network 2 is a network other than the intranet.

On the basis of image data obtained through the communication unit 10 and data stored in the storage unit 30, the control unit 20 generates monitoring screen data in which data that defines a state transition is assigned to an image object.

The control unit 20 includes an image-data obtaining unit 21, an object-data generation unit 22, a screen-data generation unit 23, an assignment processing unit 24, and a data output unit 25. The storage unit 30 can store therein template data 31, object data 32, monitoring screen data 33, definition data 34, and definition-assigned monitoring screen data 35.

Figure 2:
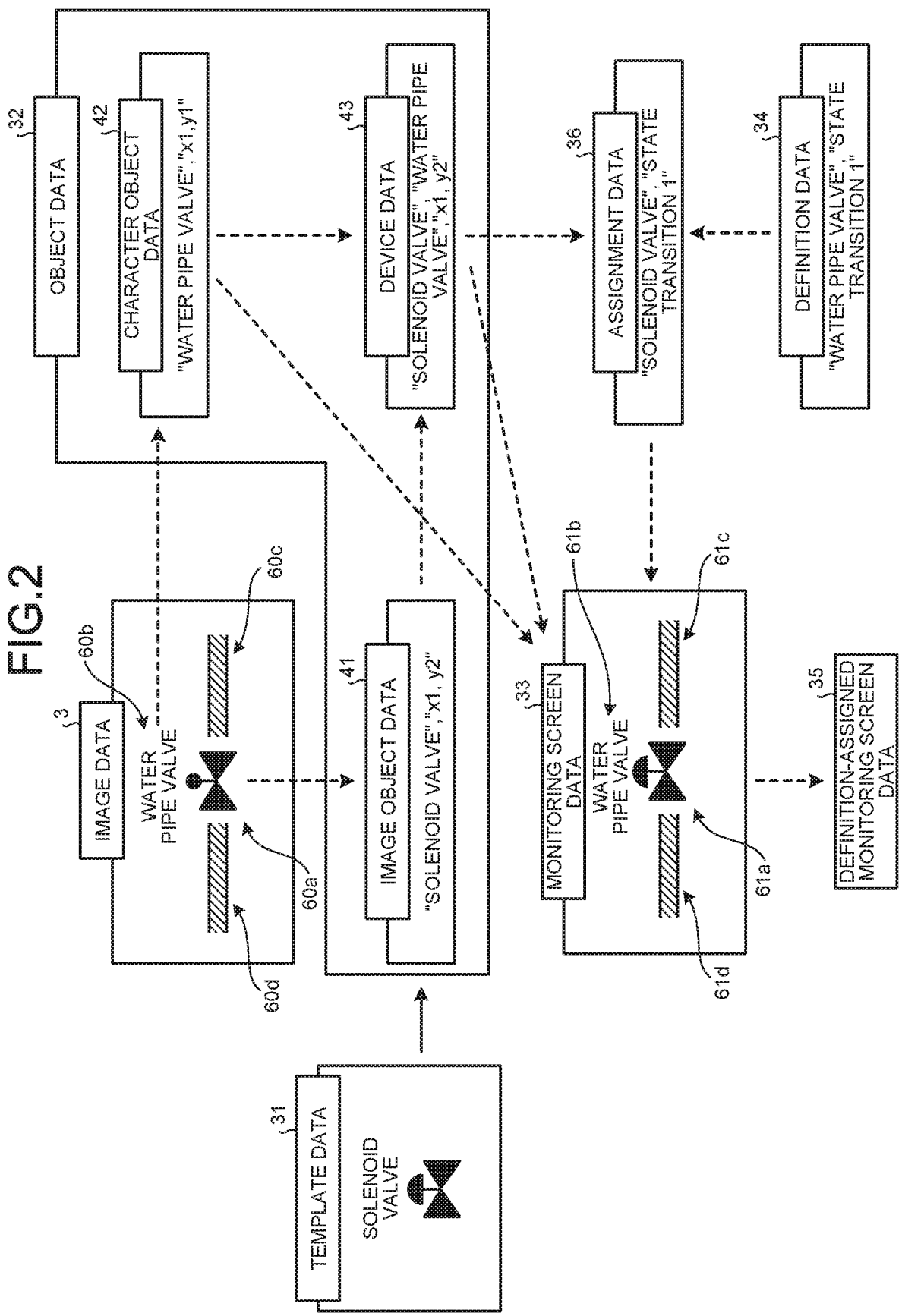
FIG. 2 is a diagram illustrating an example of processing to be performed by a control unit of the monitoring-screen-data generation device according to the first embodiment.

FIG. 2 is a diagram illustrating an example of processing to be performed by the control unit 20. With reference to FIG. 2, the processing to be performed by the control unit 20 illustrated in FIG. 1 is described below. In the example illustrated in FIG. 2, only part of the images of image data 3 obtained by the image-data obtaining unit 21 is displayed for convenience of explanation. The image of the image data 3 refers to an image before being digitized into the image data 3 and is an image obtained by reproducing the image data 3.

The object-data generation unit 22 identifies a plurality of objects 60a to 60d included in an image of the image data 3 obtained by the image-data obtaining unit 21, and generates the object data 32 that includes information on the objects 60a to 60d.

The object 60a is a symbol component and is an image object. The object 60b is a character string and is a character object. The objects 60c and 60d are line components and are image objects. Hereinafter, descriptions will be given mainly on the processing to be performed on the objects 60a and 60b for convenience of explanation. The object 60a is sometimes referred to as "image object 60a", while the object 60b is sometimes referred to as "character object 60b".

The object data 32 includes image object data 41, character object data 42, and device data 43. The image object data 41 includes information on the image object 60a. The character object data 42 includes information on the character object 60b.

The object-data generation unit 22 performs image recognition processing using the template data 31 stored in the storage unit 30 to identify the object name and the coordinates of the image object 60a from the image data 3, and generate the image object data 41.

In the example illustrated in FIG. 2, the image object data 41 includes information on the image object 60a including the object name "solenoid valve" and the coordinates "x1, y2". In the following descriptions, the object name of the image object 60a is sometimes referred to as "symbol type".

The object-data generation unit 22 performs character recognition processing to identify the character string and the coordinates of the character object 60b from the image data 3, and generate the character object data 42. In the example illustrated in FIG. 2, the character object data 42 includes information on the character object 60b including the character string "water pipe valve" and the coordinates "x1, y1".

Further, the object-data generation unit 22 generates the device data 43 on the basis of the image object data 41 and the character object data 42. Specifically, the object-data generation unit 22 determines whether the distance between the coordinates of the image object 60a and the coordinates of the character object 60b falls within a set range.

When the distance between the coordinates of the image object 60a and the coordinates of the character object 60b falls within a set range, the object-data generation unit 22 generates the device data 43 in which the object name and the coordinates of the image object 60a are associated with the character string of the character object 60b.

The device data 43 illustrated in FIG. 2 includes the object type "solenoid valve", the character string "water pipe valve", and the coordinates "x1, y2". The coordinates included in the device data 43 are not the coordinates of the character object 60b, but are the coordinates of the image object 60a.

On the basis of the character object data 42, the device data 43, and the definition data 34, the screen-data generation unit 23 generates the monitoring screen data 33 that is data of a monitoring screen including a plurality of objects 61a to 61d.

The definition data 34 includes component definition data (not illustrated) including the object name "solenoid valve" and a symbol image of the solenoid valve. The screen-data generation unit 23 extracts the symbol image of the solenoid valve from the component definition data, assigns the extracted symbol image of the solenoid valve to the coordinates "x1, y2" included in the object data 32, and assigns the character string "water pipe valve" included in the character object data 42 to the coordinates "x1, y1" so as to generate the monitoring screen data 33.

The definition data 34 described above is stored in the storage unit 30 through an input device described later. In a case where the communication unit 10 receives the definition data 34 generated by an external device through the network 2, the control unit 20 can store the definition data 34 received by the communication unit 10 in the storage unit 30.

The objects 61a, 61c, and 61d in the monitoring screen data 33 illustrated in FIG. 2 are image objects whose object name and coordinate position match those of the corresponding objects 60a, 60c, and 60d. The object 61b is a character object whose character string and coordinate position match those of the object 60b. The screen-data generation unit 23 can also generate the monitoring screen data 33 by using the image object data 41 instead of using the device data 43.

The assignment processing unit 24 generates assignment data 36 in which data that defines a state transition is assigned to the image object 60a included in a monitoring screen. In the example illustrated in FIG. 2, the assignment data 36 includes the object name "solenoid valve" and a state transition "state transition 1". The state transition "state transition 1" indicates a behavior in accordance with the state of a signal. The assignment processing unit 24 generates the definition-assigned monitoring screen data 35 that includes the assignment data 36 and the monitoring screen data 33.

The data output unit 25 outputs the definition-assigned monitoring screen data 35 that includes the image object 61a to which information indicating a state transition is assigned by the assignment processing unit 24. The definition-assigned monitoring screen data 35 can also be displayed on a display device described later.

In this manner, the monitoring-screen-data generation device 1 can automatically generate from the image data 3 the definition-assigned monitoring screen data 35 in which data that defines a state transition is assigned to the image object 61a illustrating a monitoring-target object. Thus, as compared to the case where data that defines a state transition is manually assigned to an image object, the monitoring-screen-data generation device 1 can more easily generate the definition-assigned monitoring screen data 35 in which data that defines a state transition is assigned to the image object 61a.

Figure 3:
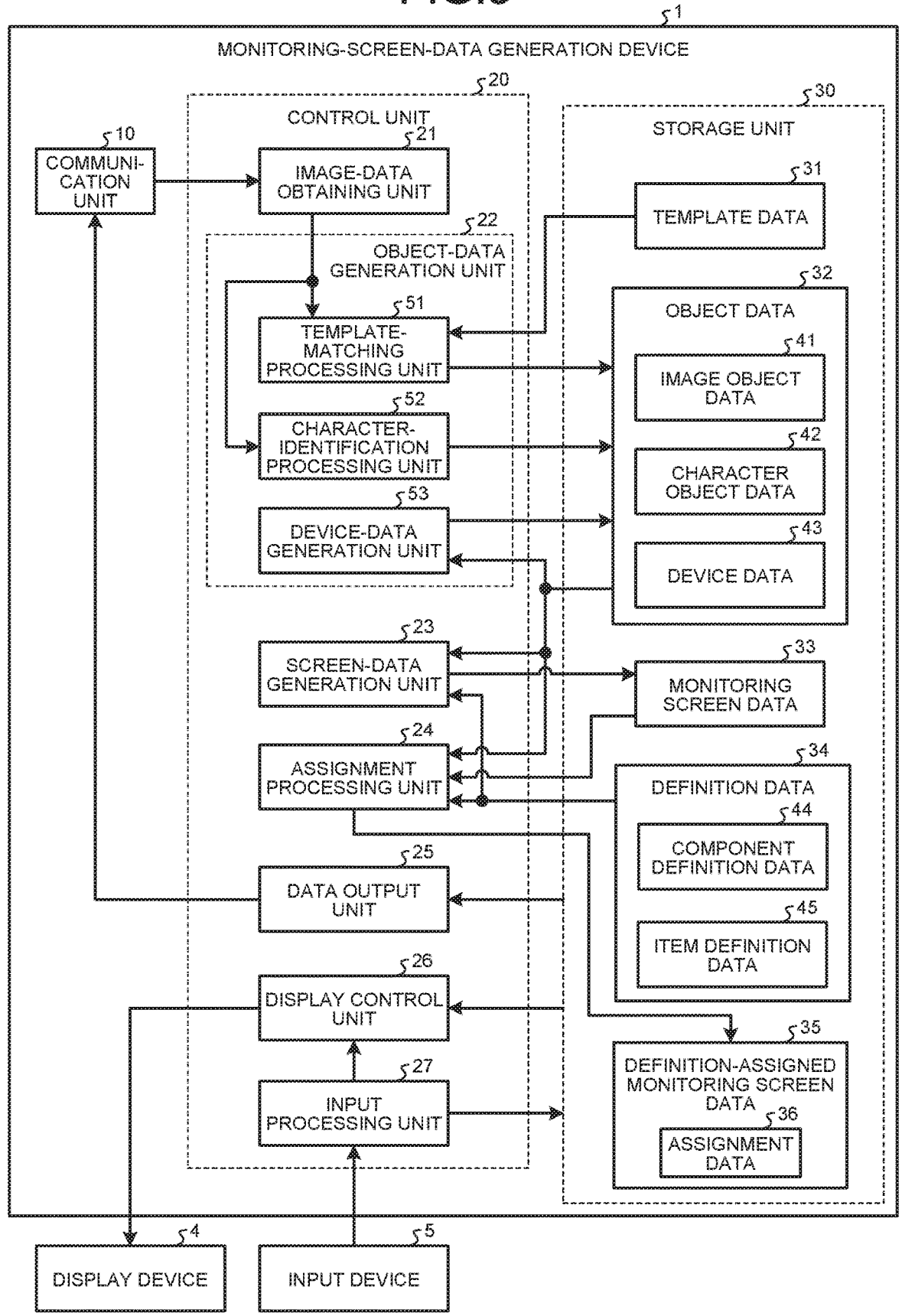
FIG. 3 is a diagram illustrating a specific example configuration of the monitoring-screen-data generation device according to the first embodiment.

The configuration and operation of the monitoring-screen-data generation device 1 are described below in more detail. FIG. 3 is a diagram illustrating a specific example configuration of the monitoring-screen-data generation device 1.

The control unit 20 in the monitoring-screen-data generation device 1 illustrated in FIG. 3 further includes a display control unit 26 and an input processing unit 27 in addition to the image-data obtaining unit 21, the object-data generation unit 22, the screen-data generation unit 23, the assignment processing unit 24, and the data output unit 25 which are described above.

The image-data obtaining unit 21 obtains from the communication unit 10 the image data 3 input from outside through the network 2 to the monitoring-screen-data generation device 1. The image data 3 is obtained as a screenshot of the computer screen or obtained by drawing a picture by hand and then capturing the picture by a capturing unit. It is also possible that the image data 3 is obtained by capturing a computer screen with a capturing unit. Examples of the capturing unit include a camera and a scanner.

Figures 4, 5:
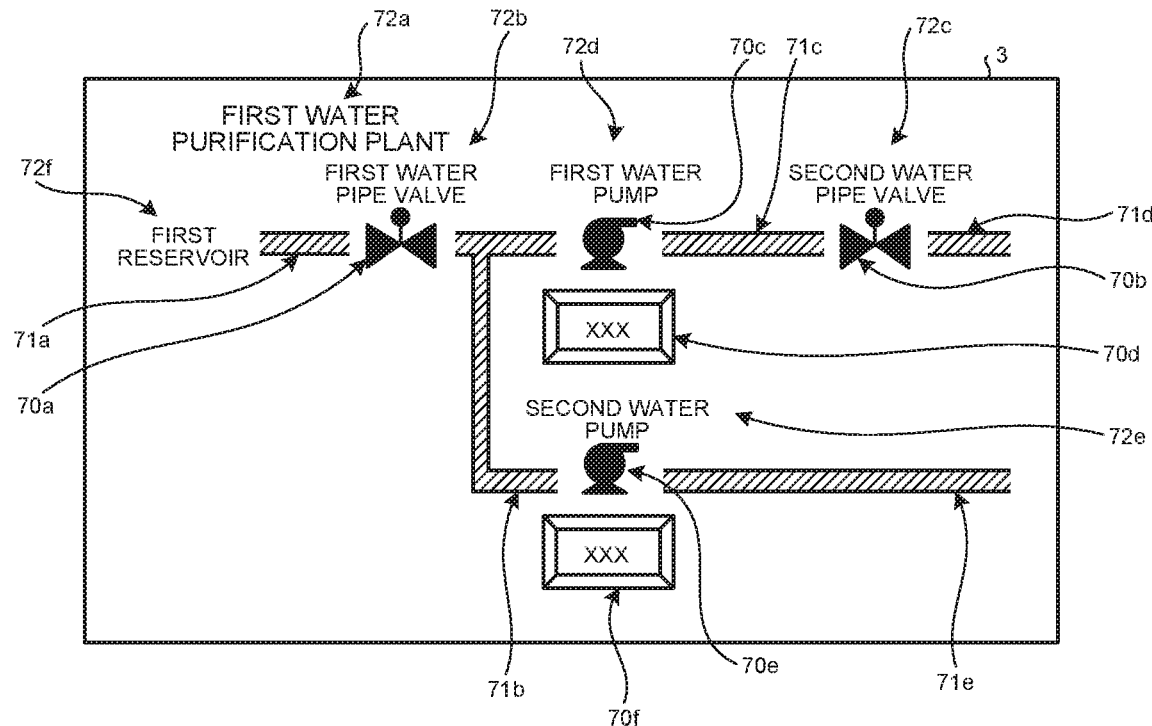
FIG. 4 is a diagram illustrating an example of an image on the basis of image data according to the first embodiment.
FIG. 5 is a diagram illustrating an example of image object data according to the first embodiment.

FIG. 4 is a diagram illustrating an example of the image of the image data 3. The image of the image data 3 illustrated in FIG. 4 includes image objects 70a to 70f that are symbol components, image objects 71a to 71e that are line components, and character objects 72a to 72f that are character strings. In the following descriptions, the image objects 70a to 70f are sometimes referred to as "image object 70", the image objects 71a to 71e are sometimes referred to as "image object 71", and the character objects 72a to 72f are sometimes referred to as "character object 72".

The object-data generation unit 22 illustrated in FIG. 3 includes a template-matching processing unit 51, a character-identification processing unit 52, and a device-data generation unit 53. The template-matching processing unit 51 is an example of a first identification unit. The character-identification processing unit 52 is an example of a second identification unit.

The template-matching processing unit 51 identifies the image objects 70 and 71 included in the image of the image data 3 on the basis of the template data 31 stored in the storage unit 30. The template data 31 includes information in which a reference image of the symbol component is associated with the symbol type for each symbol type and information in which a reference image of the line component is associated with the line type for each line type.

The template-matching processing unit 51 compares each image object 70 with the reference image of the symbol component to thereby determine the symbol type, the coordinates, and the size of each image object 70. The template-matching processing unit 51 compares each image object 71 with the reference image of the line component to thereby determine the line name, the coordinates, and the size of each image object 71.

The template-matching processing unit 51 generates and stores the image object data 41 that includes the name, the coordinates, and the size of the image objects 70a to 70f and 71a to 71e in the storage unit 30. FIG. 5 is a diagram illustrating an example of the image object data 41.

As illustrated in FIG. 5, the image object data 41 includes data in which the type, the coordinates, and the size of each image object 70 are associated with each other. The symbol type indicates the type of the image object 70 that is a symbol component. The coordinates indicate the coordinates at the center or the edge of the image object 70. The size indicates the horizontal and vertical size of the image object 70. In order that image objects of the same type are distinguishable from each other, a numeral is added to the symbol type of the image object 70 in the example illustrated in FIG. 5.

In the example illustrated in FIG. 5, the image object data 41 includes data of the image object 70a in which the symbol type "solenoid valve 1", the coordinates "50, 25", and the size "10×10" are associated with each other. The image object data 41 also includes data of the image object 70b in which the symbol type "solenoid valve 2", the coordinates "240, 25", and the size "10×10" are associated with each other. The image object data 41 further includes data of the image objects 70c to 70f as well as the data of the image objects 70a and 70b.

Although information on the image objects 71a to 71e is not illustrated in the example in FIG. 5, the image object data 41 includes data that indicates the line name, the coordinates, and the size of each image object 71. The coordinates refer to coordinates at the start point, the end point, and the branch point of the image object 71. The size refers to the line width of the image object 71.

Referring back to FIG. 3, further descriptions are given of the object-data generation unit 22. The character-identification processing unit 52 in the object-data generation unit 22 performs character recognition processing to identify the character string, the coordinates, and the size of the character objects 72a to 72f included in the image of the image data 3, and generate the character object data 42. FIG. 6 is a diagram illustrating an example of the character object data 42.

The character object data 42 illustrated in FIG. 6 includes data in which the character string, the coordinates, and the size of each character object 72 are associated with each other. The coordinates indicate the coordinates of the initial character or at the center of the character object 72. The size refers to the font size of the character object 72.

In the example illustrated in FIG. 6, the character object data 42 includes data of the character object 72a in which the character string "first water purification plant", the coordinates "5, 5", and the size "18" are associated with each other. In addition, the character object data 42 includes data of the character object 72b in which the character string "first water pipe valve", the coordinates "50, 15", and the size "12" are associated with each other. The character object data 42 further includes data of the character objects 72c to 72f as well as the data of the character objects 72a and 72b.

Referring back to FIG. 3, further descriptions are given of the object-data generation unit 22. The device-data generation unit 53 in the object-data generation unit 22 generates the device data 43 on the basis of the image object data 41 and the character object data 42.

Specifically, the device-data generation unit 53 compares the coordinates of the image object 70 with the coordinates of the character object 72. When the distance between the coordinates of the image object 70 and the coordinates of the character object 72 falls within a set range, the device-data generation unit 53 determines the image object 70 and the character object 72 as objects associated with each other. The device-data generation unit 53 then generates the device data 43 in which the symbol type, the coordinates, and the size of the image object 70 are associated with the character string of the character object 72 related to the image object 70.

It is allowable that the set range described above differs depending on the positional relation between the coordinates of the image object 70 and the coordinates of the character object 72. In this case, it is allowable that a set distance range yth when there is a vertical positional relation on the coordinate system between the coordinates of the image object 70 and the coordinates of the character object 72 is greater than a set distance range xth when there is a horizontal positional relation on the coordinate system between the coordinates of the image object 70 and the coordinates of the character object 72. Due to these set distance ranges, a character object having a vertical positional relation with an image object on the coordinate system can be associated with this image object with higher priority.

In a case where a plurality of character objects are present within a set range from the coordinates of an image object, the device-data generation unit 53 can give a higher priority to a character object having a vertical positional relation with the image object on the coordinate system to associate this character object with the image object.

The device-data generation unit 53 calculates a distance d between an image object and a character object by assigning different weights to a distance y in the vertical direction and to a distance x in the horizontal direction between the image object and the character object, and thus can associate with each other an image object and a character object having the shortest distance d.

It is assumed that the coordinates of an image object are defined as "x1, y1", while the coordinates of a character object are defined as "x2, y2". In this case, the device-data generation unit 53 can associate an image object with a character object having the shortest distance d, led by the following equation (1), among a plurality of character objects that are present within a set range from the coordinates of the image object. In the following equation (1), when k1<k2, the distance in the vertical direction can be heavily weighted.

$$d=\sqrt{(k1 \times x1 - k1 \times x2)^2 + (k2 \times y1 - k2 \times y2)^2} \quad (1)$$

In a case where a plurality of character objects are present within a set range from the coordinates of an image object, the device-data generation unit 53 can associate the image object with the character objects.

FIG. 7 is a diagram illustrating an example of the device data 43. As illustrated in FIG. 7, the device data 43 includes data in which the symbol type, the device name, the coordinates, and the size are associated with each other.

In the example illustrated in FIG. 7, the symbol type "solenoid valve 1" is associated with the device name "first water pipe valve", the coordinates "50, 25", and the size "10×10". The symbol type "solenoid valve 2" is associated with the device name "second water pipe valve", the coordinates "240, 25", and the size "10×10". Likewise, each of the symbol types "right-side outlet pump 1", "numerical-value button 1", "right-side outlet pump 2", and "numerical-value button 2" is associated with the device name, the coordinates, and the size.

The object-data generation unit 22 stores, in the storage unit 30, the object data 32 that includes the image object data 41, the character object data 42, and the device data 43, which are generated in the manner as described above.

Referring back to FIG. 3, further descriptions are given of the control unit 20. The screen-data generation unit 23 in the control unit 20 generates the monitoring screen data 33 on the basis of the character object data 42, the device data 43, and component definition data 44. The component definition data 44 refers to data that is included in the definition data 34 and that associates the symbol type with the symbol image.

Figures 8, 9:
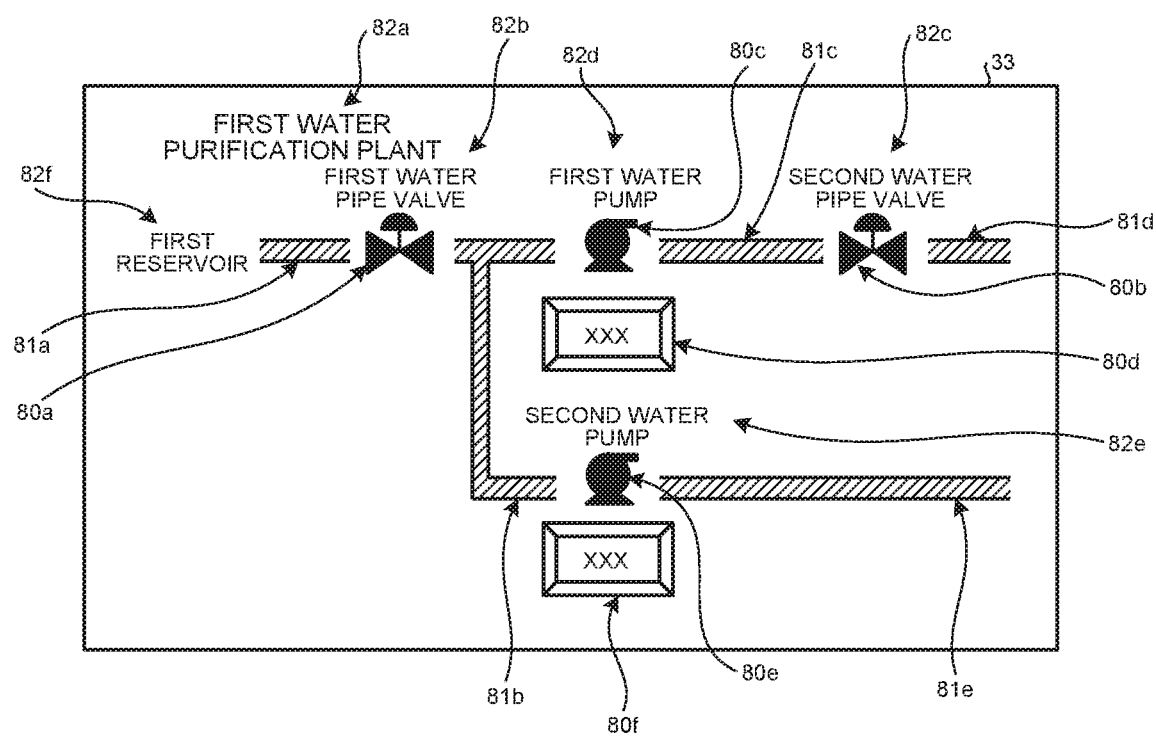
FIG. 8 is a diagram illustrating an example of component definition data according to the first embodiment.
FIG. 9 is a diagram illustrating an example of a screen of monitoring screen data according to the first embodiment.

FIG. 8 is a diagram illustrating an example of the component definition data 44. As illustrated in FIG. 8, the symbol type "solenoid valve" is associated with the symbol image of the solenoid valve, while the symbol type "right-side outlet pump" is associated with the symbol image of the right-side outlet pump.

FIG. 9 is a diagram illustrating an example of the screen of the monitoring screen data 33. In the example illustrated in FIG. 9, the monitoring screen data 33 includes image objects 80a to 80f that are symbol components, image objects 81a to 81e that are line components, and character objects 82a to 82f that are character strings.

The screen-data generation unit 23 assigns the image objects 80a to 80f illustrated in FIG. 9 on a monitoring screen on the basis of the symbol type, the coordinates, and the size of the image objects 70a to 70f included in the image object data 41.

Specifically, the screen-data generation unit 23 extracts a symbol image associated with the symbol type of the image object 70a from the component definition data 44. The screen-data generation unit 23 assigns, as the image object 80a, the extracted symbol image at the coordinate position of the image object 70a such that the extracted symbol image has a size of the image object 70a.

That is, the screen-data generation unit 23 assigns, as the image object 80a, the image of the symbol type "solenoid valve" at the position of the coordinates "50, 25" such that it has a size "10×10". The screen-data generation unit 23 performs the same process on the image objects 80b to 80f as having performed on the image object 80a.

The screen-data generation unit 23 assigns the image objects 81a to 81e illustrated in FIG. 9 on the monitoring screen on the basis of the line type, the coordinates, and the size of the image objects 71a to 71e included in the image object data 41.

Specifically, the screen-data generation unit 23 extracts a line image associated with the line type of the image object 81a from the component definition data 44. The screen-data generation unit 23 assigns, as the image object 81a, the extracted line image at the coordinate position of the image object 71a such that the extracted line image has a size of the image object 71a. The screen-data generation unit 23 performs the same process on the image objects 81b to 81e as having performed on the image object 81a.

The screen-data generation unit 23 assigns the character objects 82a to 82f illustrated in FIG. 9 on the monitoring screen on the basis of the character string, the coordinates, and the size of the character objects 72a to 72f included in the character object data 42.

Specifically, the screen-data generation unit 23 assigns, as the character object 82a, the character string of the character object 72a at the coordinate position of the character object 72a such that it has a size of the character object 72a. That is, the screen-data generation unit 23 assigns, as the character object 82a, the character string "first water purification plant" at the position of the coordinates "5, 5" such that it has a size of "18". The screen-data generation unit 23 performs the same process on the character objects 82b to 82f as having performed on the character object 82a.

The monitoring screen data 33 generated by the screen-data generation unit 23 includes the image, the object name, and the coordinates of each of the image objects 80a to 80f and 81a to 81e, and also includes the character string and the coordinates of each of the character objects 82a to 82f. It is sufficient if the monitoring screen data 33 is configured such that each of the image objects 80a to 80f and 81a to 81e is displayed in such a manner that it is possible to indicate a state transition. The data configuration is not limited to the example described above.

Referring back to FIG. 3, further descriptions are given of the control unit 20. On the basis of item definition data 45 and the object data 32, the assignment processing unit 24 in the control unit 20 generates the definition-assigned monitoring screen data 35 in which data that defines a state transition is assigned to each of the image objects 80a to 80f included in a monitoring screen. The item definition data 45 is data included in the definition data 34 and defines a state transition.

FIG. 10 is a diagram illustrating an example of the item definition data 45. The item definition data 45 is data that defines a state transition, in which the device name, the behavior, the signal name, and the signal code are associated with each other as illustrated in FIG. 10. In the example illustrated in FIG. 10, a numerical value is added to each of the state transitions such that the state transitions are distinguishable from each other.

"Device name" is the name of a monitoring-target device provided in a plant. "Behavior" is information indicating a behavior of a symbol that is the image object 80. For example, the "behavior" is information indicating how the image object 80 is changed depending on the signal state, and is also information for displaying an operation screen for the monitoring-target device on the basis of an operation on the image object 80.

"Signal name" is the name of a signal received from the monitoring-target device. "On" represents a signal indicating whether the device is in operation or stopped. "Fault" represents a signal indicating the occurrence of a fault. "Flow rate" represents the amount of water flowing by a pump. "Signal code" is an identification code of a signal of a device included in the monitoring control system that monitors and controls the plant. Examples of the signal of the device include an instrumentation signal, a control signal, and a sensor signal.

In the example illustrated in FIG. 10, in the item definition data 45, the behavior "behavior 1", the signal name "on", and the signal code "D11" are associated with the device name "first water pipe valve". "Behavior 1" is information in which the signal state is associated with the status of a change in at least one of color, shape, and pattern of the image object 80. Therefore, on the basis of the state of a signal with the signal code "D11", the status of the image object 80 is changed.

The behavior "behavior 2", the signal name "fault", and the signal code "D12" are also associated with the device name "first water pipe valve" in the item definition data 45. "Behavior 2" is information in which the signal state is associated with the status of a change in at least one of color, shape, and pattern of the image object 80. Therefore, on the basis of the state of a signal with the signal code "D12", the status of the image object 80 is changed.

In the item definition data 45, the behavior, the signal name, and the signal code are associated with each of the device names in the item definition data 45, which are "second water pipe valve", "first water pump", and "second water pump", in the same manner as the device name "first water pipe valve". For example, the behavior "behavior 6", the signal name "flow rate", and the signal code "D16" are associated with the device name "first water pump". "Behavior 6" is information indicating a display of the signal state. Therefore, the flow rate that is the state of a signal with the signal code "D16" is displayed as the image object 80.

The assignment processing unit 24 generates the assignment data 36 on the basis of the item definition data 45 and the object data 32. Specifically, the assignment processing unit 24 compares the device name included in the item definition data 45 with the device name included in the device data 43. The assignment processing unit 24 generates the assignment data 36 in which the behavior and the signal, included in the item definition data 45 including a device name that matches the device name included in the device data 43, are associated with the symbol type included in the device data 43.

FIG. 11 is a diagram illustrating an example of the assignment data 36. As illustrated in FIG. 11, the assignment data 36 is data in which the symbol type, the behavior, and the signal code are associated with each other. In the assignment data 36 illustrated in FIG. 11, the behavior "behavior 1" and the signal code "D11" are associated with the image object 80a that is a symbol of the symbol type "solenoid valve 1".

In addition, the behavior "behavior 2" and the signal code "D12" are associated with the image object 80a that is a symbol of the symbol type "solenoid valve 1". A behavior and a signal code are also assigned to each of the symbols of the image objects 80b to 80f in the same manner as the image object 80a.

It is sufficient if the assignment data 36 is configured such that a behavior and a signal are assigned to the symbols of the image objects 80a to 80f. The assignment data 36 is not limited to the example illustrated in FIG. 11. For example, it is also possible that a behavior and a signal code are assigned not to the symbol types of the image objects 80a to 80f but to identifiers of the image objects 80a to 80f.

It is further possible that the assignment data 36 includes information indicating the coordinates of the image objects 80a to 80f, instead of the identifiers or the symbol types of the image objects 80a to 80f. That is, it is sufficient if the assignment data 36 is data in which a behavior and a signal code are assigned to information that can identify the image objects 80a to 80f.

It is sufficient if the definition-assigned monitoring screen data 35 is configured such that a behavior and a signal are assigned to the image objects 80a to 80f. It is also allowable that a behavior and a signal are assigned to the image objects 80a to 80f by using assignment data other than the assignment data 36 described above. That is, it is sufficient if the monitoring control system that monitors and controls the plant is configured such that the definition-assigned monitoring screen data 35 is consequently generated in which a behavior and a signal are assigned to the image object 80 indicating a monitoring-target device so that the behavior is implemented in accordance with the state of the signal.

Referring back to FIG. 3, further descriptions are given of the control unit 20. The display control unit 26 in the control unit 20 can display data stored in the storage unit 30 on a display device 4. Specifically, the display control unit 26 can selectively display at least one of the object data 32, the monitoring screen data 33, the definition data 34, and the definition-assigned monitoring screen data 35 on the display device 4.

The input processing unit 27 in the control unit 20 can change at least one of the object data 32, the monitoring screen data 33, the definition data 34, and the definition-assigned monitoring screen data 35 on the basis of an input to an input device 5.

Figure 12:
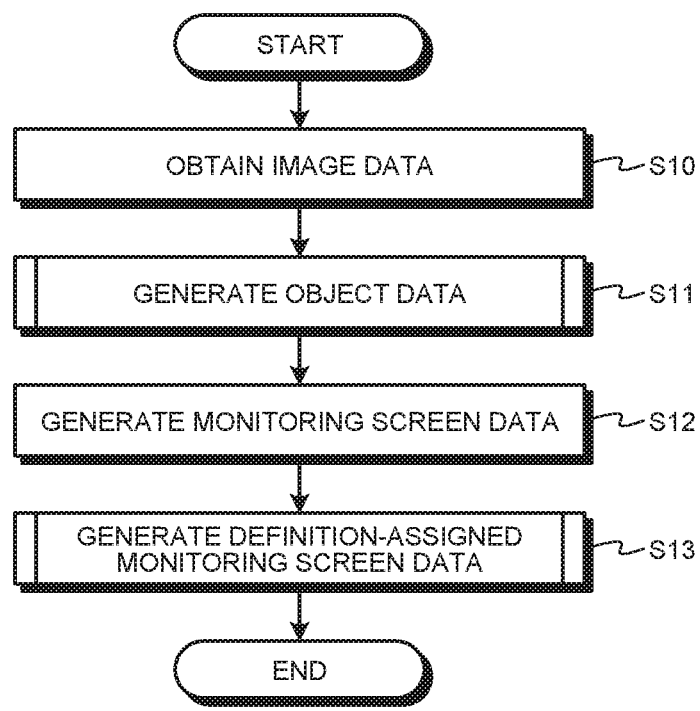
FIG. 12 is a flowchart illustrating an example of processing in the control unit according to the first embodiment.

The processing in the control unit 20 is described below using a flowchart. FIG. 12 is a flowchart illustrating an example of processing in the control unit 20 according to the first embodiment.

As illustrated in FIG. 12, the image-data obtaining unit 21 in the control unit 20 obtains the image data 3 from outside (Step S10). Next, the object-data generation unit 22 in the control unit 20 extracts a plurality of objects included in the image of the image data 3, and generates the object data 32 (Step S11). A process at Step S11 is equivalent to processes at Steps S20 to S31 which are described later in FIG. 13, which are described later in detail.

Next, the screen-data generation unit 23 in the control unit 20 generates the monitoring screen data 33 that is data of a monitoring screen on the basis of the object data 32 generated at Step S11 and the component definition data 44 (Step S12). The control unit 20 generates the definition-assigned monitoring screen data 35 that includes the assignment data 36 and the monitoring screen data 33 (Step S13). A process at Step S13 is equivalent to processes at Steps S40 to S44 illustrated in FIG. 14, which are described later in detail.

Figure 13:
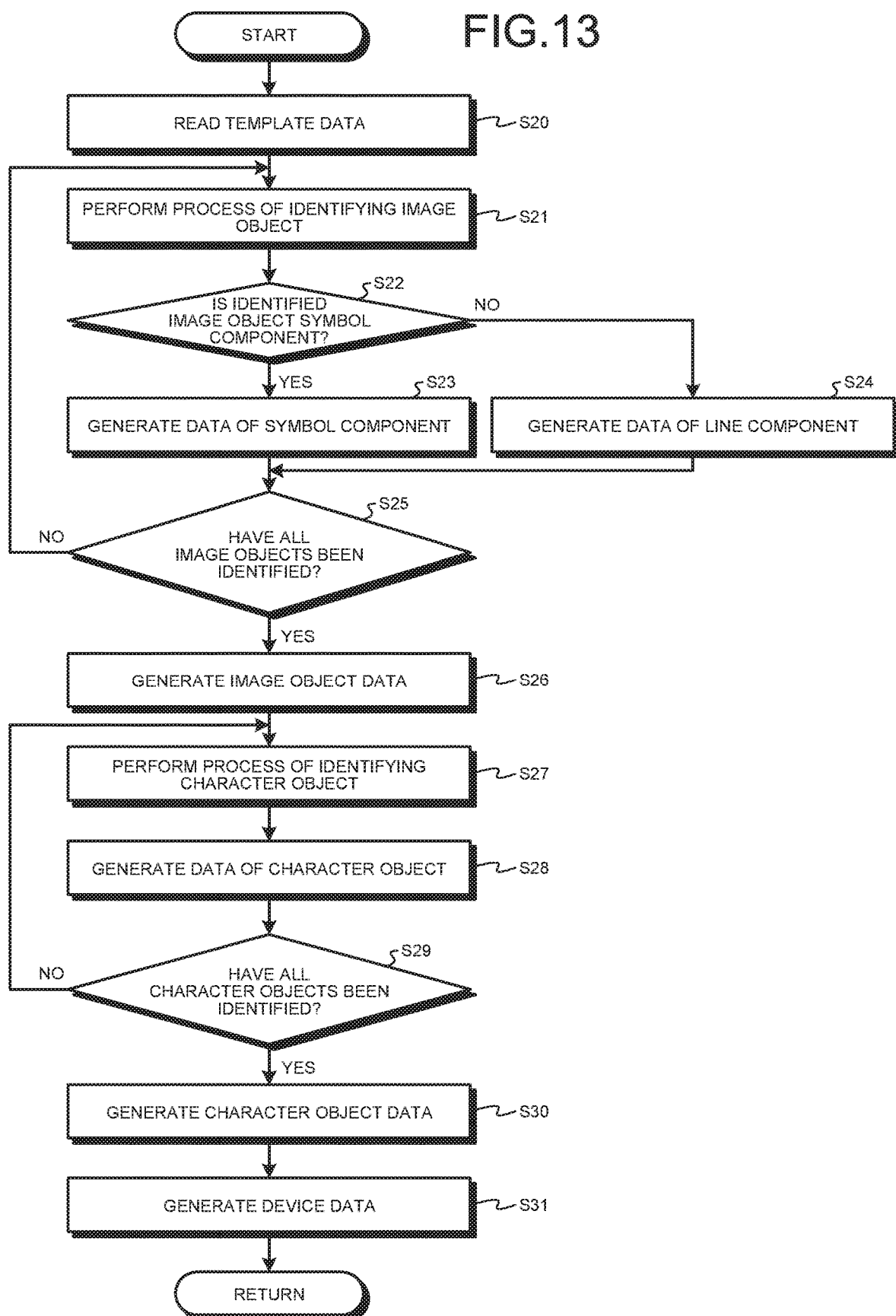
FIG. 13 is a flowchart illustrating a process at Step S11 illustrated in FIG. 12.

FIG. 13 is a flowchart illustrating the process at Step S11 illustrated in FIG. 12. As illustrated in FIG. 13, the object-data generation unit 22 reads the template data 31 from the storage unit 30 (Step S20). Next, the object-data generation unit 22 uses the template data 31 to perform a process of identifying an image object included in the image data 3 (Step S21).

The object-data generation unit 22 determines whether the identified image object is a symbol component (Step S22). When the object-data generation unit 22 determines that the identified image object is a symbol component (YES at Step S22), the object-data generation unit 22 generates data of the symbol component (Step S23). When the object-data generation unit 22 determines that the identified image object is not a symbol component (NO at Step S22), the object-data generation unit 22 generates data of a line component (Step S24).

When a process at Step S23 or Step S24 is ended, the object-data generation unit 22 determines whether the process of identifying all of the image objects included in the image data 3 has been ended (Step S25). When the object-data generation unit 22 determines that the process of identifying all of the image objects has not yet been ended (NO at Step S25), the object-data generation unit 22 returns to the process at Step S21.

When the object-data generation unit 22 determines that the process of identifying all of the image objects has been ended (YES at Step S25), the object-data generation unit 22 generates the image object data 41 that includes the data of the symbol components generated at Step S23 and the data of the line components generated at Step S24 (Step S26).

Next, the object-data generation unit 22 performs a process of identifying a character object included in the image data 3 (Step S27), and generates data of the identified character object (Step S28). The object-data generation unit 22 determines whether the process of identifying all of the character objects included in the image data 3 has been ended (Step S29).

When the object-data generation unit 22 determines that the process of identifying all of the character objects has not yet been ended (NO at Step S29), the object-data generation unit 22 returns to the process at Step S27. When the object-data generation unit 22 determines that the process of identifying all of the character objects has been ended (YES at Step S29), the object-data generation unit 22 generates the character object data 42 that includes the data of all of the character objects generated at Step S28 (Step S30).

Next, the object-data generation unit 22 generates the device data 43 on the basis of the image object data 41 generated at Step S26 and the character object data 42 generated at Step S30 (Step S31), and then ends the processes illustrated in FIG. 13.

Figure 14:
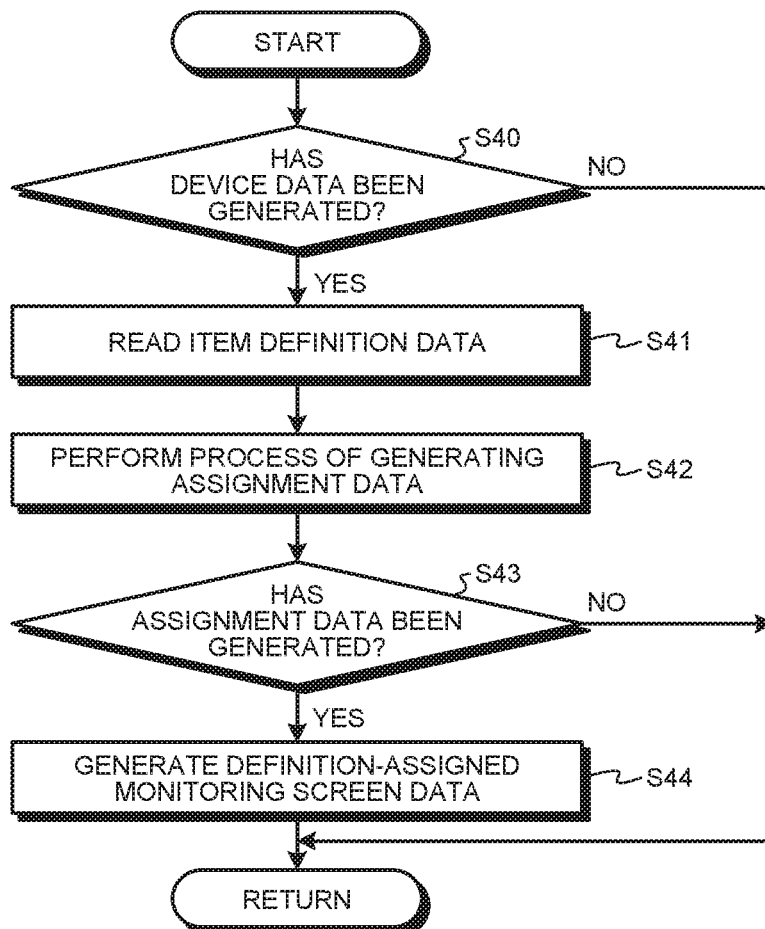
FIG. 14 is a flowchart illustrating a process at Step S13 illustrated in FIG. 12.

FIG. 14 is a flowchart illustrating the process at Step S13 illustrated in FIG. 12. As illustrated in FIG. 14, the assignment processing unit 24 in the control unit 20 determines whether the device data 43 has been generated at Step S11 (Step S40).

When the device data 43 is determined to have been generated (YES at Step S40), the assignment processing unit 24 reads the item definition data 45 from the storage unit 30 (Step S41). The assignment processing unit 24 then performs a process of generating the assignment data 36 on the basis of the item definition data 45 and the object data 32 (Step S42).

Next, the assignment processing unit 24 determines whether the assignment data 36 has been generated (Step S43). The assignment data 36 is generated when at least one of the character strings of the "device name" included in the item definition data 45 matches a character string of the device name included in the device data 43. In contrast, the assignment data 36 is not generated when any of the character strings of the "device name" included in the item definition data 45 does not match a character string of the device name included in the device data 43.

When the assignment data 36 is determined to have been generated (YES at Step S43), the assignment processing unit 24 generates the definition-assigned monitoring screen data 35 that includes the assignment data 36 and the monitoring screen data 33 (Step S44).

When it is determined that the device data 43 has not been generated at Step S40 (NO at Step S40), when it is determined that the assignment data 36 has not been generated at Step S43 (NO at Step S43), or when a process at Step S44 has been ended, the control unit 20 ends the processes illustrated in FIG. 14.

Figure 15:
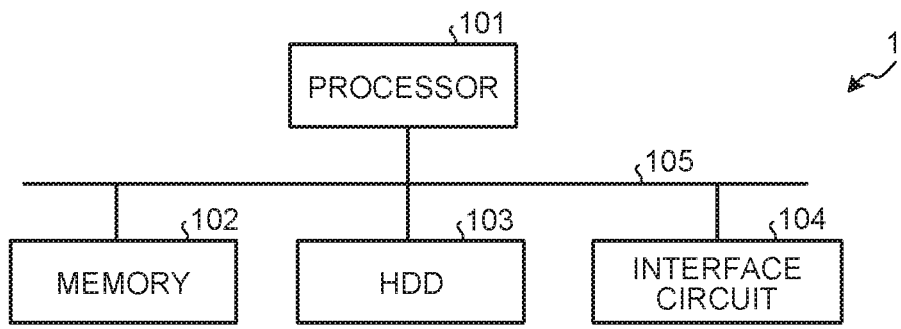
FIG. 15 is a diagram illustrating an example of a hardware configuration of the monitoring-screen-data generation device according to the first embodiment.

FIG. 15 is a diagram illustrating an example of a hardware configuration of the monitoring-screen-data generation device 1 according to the first embodiment. As illustrated in FIG. 15, the monitoring-screen-data generation device 1 is a computer including a processor 101, a memory 102, an HDD 103, and an interface circuit 104. The processor 101, the memory 102, the HDD 103, and the interface circuit 104 are capable of transmitting and receiving data to and from each other through a bus 105. The communication unit 10 is implemented by the interface circuit 104. The storage unit 30 is implemented by the memory 102 and the HDD 103.

The processor 101 reads and executes the OS and processing programs stored in the HDD 103 so as to implement the respective functions of the image-data obtaining unit 21, the object-data generation unit 22, the screen-data generation unit 23, the assignment processing unit 24, the data output unit 25, the display control unit 26, and the input processing unit 27. The processor 101 can also read the OS and processing programs from one or more of the storage media including a magnetic disc, a universal serial bus (USB) memory, an optical disc, a compact disc, and a digital versatile disc (DVD) through an interface (not illustrated), and can store the OS and processing programs in the HDD 103 and execute the OS and processing programs.

The processor 101 is an example of the processing circuit, and includes one or more of a CPU, a digital signal processor (DSP), and a system large scale integration (LSI). The memory 102 is a storage area to be used as a workspace for the processor 101, and is a nonvolatile or volatile semiconductor memory as typified by a random access memory (RAM).

As described above, the monitoring-screen-data generation device 1 according to the first embodiment includes the image-data obtaining unit 21, the object-data generation unit 22, the screen-data generation unit 23, and the assignment processing unit 24. The image-data obtaining unit 21 obtains the image data 3 that is data of an image. The object-data generation unit 22 identifies a plurality of objects 70, 71, and 72 included in the image of the image data 3 obtained by the image-data obtaining unit 21, and generates the object data 32 that includes information on the identified objects 70, 71, and 72. On the basis of the object data 32 generated by the object-data generation unit 22, the screen-data generation unit 23 generates the monitoring screen data 33 that is data of a monitoring screen including the image objects 70 and 71 and a character object 72. On the basis of the definition data 34 that defines a state transition, and the object data 32, the assignment processing unit 24 assigns the assignment data 36, which is an example of the data that defines a state transition, to the image object 70 included in the monitoring screen of the monitoring screen data 33.

Thus, as compared to the case where the assignment data 36 is manually assigned to the image object 70, the monitoring-screen-data generation device 1 can more easily generate the definition-assigned monitoring screen data 35 in which the assignment data 36 is assigned to the image object 61a. The monitoring-screen-data generation device 1 can generate the monitoring screen data 33 from screenshot image data or image data captured by a scanner.

For this reason, the monitoring-screen-data generation device 1 can still generate the monitoring screen data 33 on the basis of another firm's monitoring screen image data which does not have data compatibility.

The object-data generation unit 22 further includes the template-matching processing unit 51 that is an example of the first identification unit, the character-identification processing unit 52 that is an example of the second identification unit, and the device-data generation unit 53. The template-matching processing unit 51 identifies the image objects 70 and 71 among a plurality of objects 70, 71, and 72, and generates the image object data 41 that includes the coordinates of the identified image objects 70 and 71. The character-identification processing unit 52 identifies the character object 72 that is an object of characters among the objects 70, 71, and 72, and generates the character object data 42 that includes the coordinates of the identified character object 72. On the basis of the coordinates of the image object 70 and the coordinates of the character object 72, the device-data generation unit 53 generates the device data 43 in which the image object 70 is associated with the character object 72. On the basis of the result of comparison between the device name included in the definition data 34 and the character object 72 included in the device data 43, the assignment processing unit 24 assigns the assignment data 36 that defines a state transition to the image object 70 included in the monitoring screen. In this manner, the device data 43 in which the image object 70 is associated with the character object 72 is generated, so that data that defines a state transition can be easily assigned to the image object 70.

Second Embodiment

Figure 16:
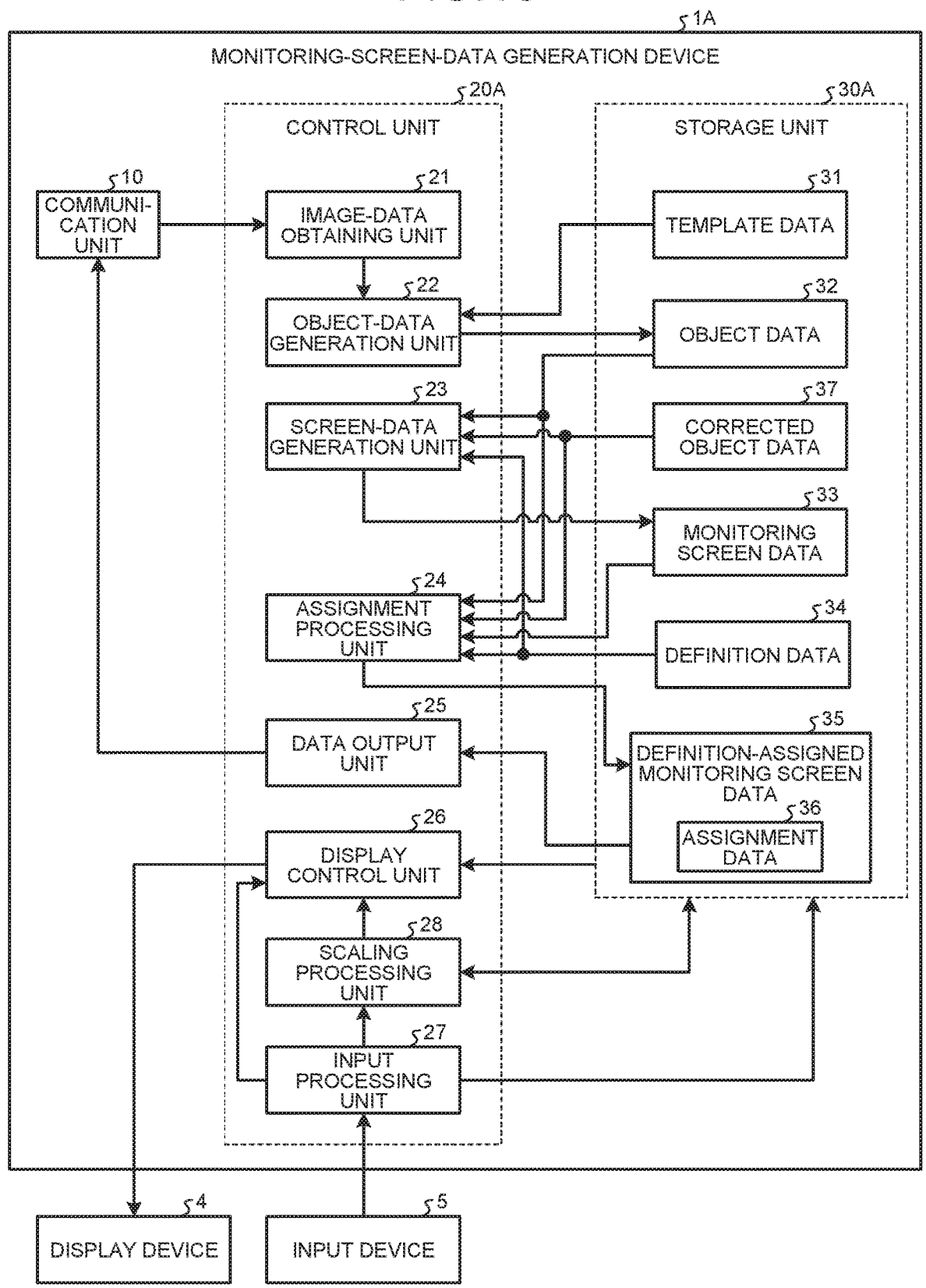
FIG. 16 is a diagram illustrating an example configuration of a monitoring-screen-data generation device according to a second embodiment.

A second embodiment is different from the first embodiment in that a scaling process is added. In the scaling process, an object sized differently from the image object of the image data 3 is included in the monitoring screen data 33. In the following descriptions, constituent elements having functions identical to those of the first embodiment are denoted by like reference signs and explanations thereof will be omitted, and differences from the monitoring-screen-data generation device 1 according to the first embodiment are mainly explained. FIG. 16 is a diagram illustrating an example configuration of a monitoring-screen-data generation device 1A according to the second embodiment.

As illustrated in FIG. 16, a control unit 20A in the monitoring-screen-data generation device 1A according to the second embodiment further includes a scaling processing unit 28 in addition to the configuration of the control unit 20. A storage unit 30A in the monitoring-screen-data generation device 1A can store therein corrected object data 37 in addition to the data stored in the storage unit 30.

The scaling processing unit 28 reads the object data 32 from the storage unit 30A, generates scaling-factor setting screen data on the basis of the object data 32 having been read, and outputs the scaling-factor setting screen data to the display control unit 26. On the basis of the scaling-factor setting screen data, the display control unit 26 displays a scaling-factor setting screen on the display device 4.

FIG. 17 is a diagram illustrating an example of a scaling-factor setting screen 62 displayed on the display device 4. On the scaling-factor setting screen 62 illustrated in FIG. 17, entry boxes 63a to 63f are placed for individual symbol components that are image objects, entry boxes 64a to 64e are placed for individual line components that are image objects, and entry boxes 65a to 65f are placed for individual character strings that are character objects.

The multiplying factor set in each of the entry boxes 63a to 63f, 64a to 64e, and 65a to 65f is a scaling factor of an object included in the image of the image data 3. The multiplying factor set in each of the entry boxes 63a to 63f, 64a to 64e, and 65a to 65f can be changed by an operation through the input device 5.

When a setting button 67 provided on the scaling-factor setting screen 62 is operated through the input device 5, the scaling processing unit 28 generates the corrected object data 37 by multiplying the size of the corresponding object in the object data 32 by a multiplying factor which has been changed by the operation through the input device 5 among the multiplying factors in the entry boxes 63a to 63f, 64a to 64e, and 65a to 65f. The scaling processing unit 28 stores the generated corrected object data 37 in the storage unit 30A.

In a case where the image object 80a of the symbol type "solenoid valve 1" has a size "10×10" as illustrated in FIG. 7, when the multiplying factor in the entry box 63a is changed to "80%", then the scaling processing unit 28 changes the size of the image object 80a to "8×8".

When a cancel button 68 provided on the scaling-factor setting screen 62 is operated through the input device 5, the scaling processing unit 28 deletes the corrected object data 37 stored in the storage unit 30A.

On the scaling-factor setting screen 62 illustrated in FIG. 17, an entry box 66 is placed in order to set the multiplying factor of all of the objects collectively. The multiplying factor set in the entry box 66 can also be changed by an operation through the input device 5 in the same manner as the multiplying factor set in each of the entry boxes 63a to 63f, 64a to 64e, and 65a to 65f.

When the setting button 67 provided on the scaling-factor setting screen 62 is operated through the input device 5, the scaling processing unit 28 generates the corrected object data 37 by multiplying the sizes of all of the objects included in the object data 32 by the multiplying factor set in the entry box 66. The scaling processing unit 28 stores the generated corrected object data 37 in the storage unit 30A.

In the example described above, the "multiplying factor" is specified in the entry boxes 63a to 63f, 64a to 64e, 65a to 65f, and 66. It is also possible to specify the "size" in the entry boxes 63a to 63f, 64a to 64e, 65a to 65f, and 66.

The processing in the control unit 20A is described below using a flowchart. FIG. 18 is a flowchart illustrating an example of processing in the control unit 20A according to the second embodiment.

As illustrated in FIG. 18, the image-data obtaining unit 21 in the control unit 20A obtains the image data 3 from outside (Step S50). Next, the object-data generation unit 22 in the control unit 20A extracts a plurality of objects included in the image of the image data 3, and generates the object data 32 (Step S51). The process at Step S51 is equivalent to the processes at Step S20 to S30 in FIG. 13 described above. The process at Step S31 in FIG. 13 is performed as a process at Step S56 described later.

Next, the scaling processing unit 28 in the control unit 20A generates scaling-factor setting screen data on the basis of the object data 32, while the display control unit 26 displays the scaling-factor setting screen 62 on the display device 4 on the basis of the scaling-factor setting screen data (Step S52).

Subsequently, the scaling processing unit 28 determines whether there is a request for scaling setting (Step S53). When the setting button 67 described above is operated, the scaling processing unit 28 determines that there is a request for scaling setting. When the scaling processing unit 28 determines that there is a request for scaling setting (YES at Step S53), the scaling processing unit 28 generates the corrected object data 37 by multiplying the size of the corresponding object in the object data 32 by a multiplying factor set in the entry box on the scaling-factor setting screen 62 (Step S54).

Next, the screen-data generation unit 23 in the control unit 20A generates the monitoring screen data 33 that is data of a monitoring screen on the basis of the corrected object data 37 generated at Step S54 and the component definition data 44 (Step S55). The control unit 20A performs the same process as at Step S31 to generate the device data 43 on the basis of the corrected object data 37 (Step S56). The control unit 20A performs the same process as at Step S13 to generate the definition-assigned monitoring screen data 35 that includes the assignment data 36 and the monitoring screen data 33 (Step S57).

The assignment processing unit 24 can also change the type and the numeric of a behavior to be assigned to an image object in accordance with the size of the image object. In this case, the item definition data 45 is data in which the device name, the behavior, the signal name, and the signal code are associated with each other for each size type. The size types represent a plurality of size ranges. The size range is, for example, the size that ranges from "6×6" or more to less than "8×8". There may be a case where the size of an image object becomes so small that it is difficult to visually recognize the behavior of the image object. However, by changing the type and numeric of the behavior to be assigned to the image objects in accordance with each size of the image objects in the manner as described above, it is possible to assign a behavior that is more visible.

In the example described above, the scaling processing unit 28 generates the corrected object data 37 before the screen-data generation unit 23 generates the monitoring screen data 33. The scaling processing unit 28 can also generate the corrected object data 37 after the screen-data generation unit 23 generates the monitoring screen data 33. In this case, on the basis of an operation on an object of the monitoring screen data 33 generated based on the object data 32, the scaling processing unit 28 can change the scaling of the object and generate the corrected object data 37.

An example of the hardware configuration of the monitoring-screen-data generation device 1A according to the second embodiment is identical to the hardware configuration of the monitoring-screen-data generation device 1 illustrated in FIG. 15. The processor 101 reads and executes programs stored in the memory 102 that functions as the storage unit 30A, and can thereby implement the function of the scaling processing unit 28 in addition to the functions of the control unit 20 described above.

As described above, the monitoring-screen-data generation device 1A according to the second embodiment includes the scaling processing unit 28 that is an example of the size changing unit. The scaling processing unit 28 changes the size of a part or all of the objects 70a to 70f, 71a to 71e, and 72a to 72f (see FIG. 4) included in the object data 32. The screen-data generation unit 23 generates the monitoring screen data 33 on the basis of the corrected object data 37 that includes data of any of the objects 70a to 70f, 71a to 71e, and 72a to 72f whose size has been changed by the scaling processing unit 28. Due to this operation, the object size of a part of the objects 70a to 70f, 71a to 71e, and 72a to 72f is changed and thereby the part of the objects can be highlighted. Moreover, a plurality of pieces of object data obtained from plural types of image data 3 can be combined to generate a single monitoring screen in such a manner that the objects 70a to 70f, 71a to 71e, and 72a to 72f do not overlap one another. Therefore, the monitoring screen data 33 with higher visibility can be generated more flexibly.

Third Embodiment

In the first and second embodiments, the assignment data 36 is created on the basis of the item definition data 45. A third embodiment is different from the first and second embodiments in that assignment data is created on the basis of item template data. In the following descriptions, constituent elements having functions identical to those of the first embodiment are denoted by like reference signs and explanations thereof will be omitted, and differences from the monitoring-screen-data generation device 1 according to the first embodiment are mainly explained. However, the third embodiment can also be applied to the monitoring-screen-data generation device 1A according to the second embodiment.

Figure 19:
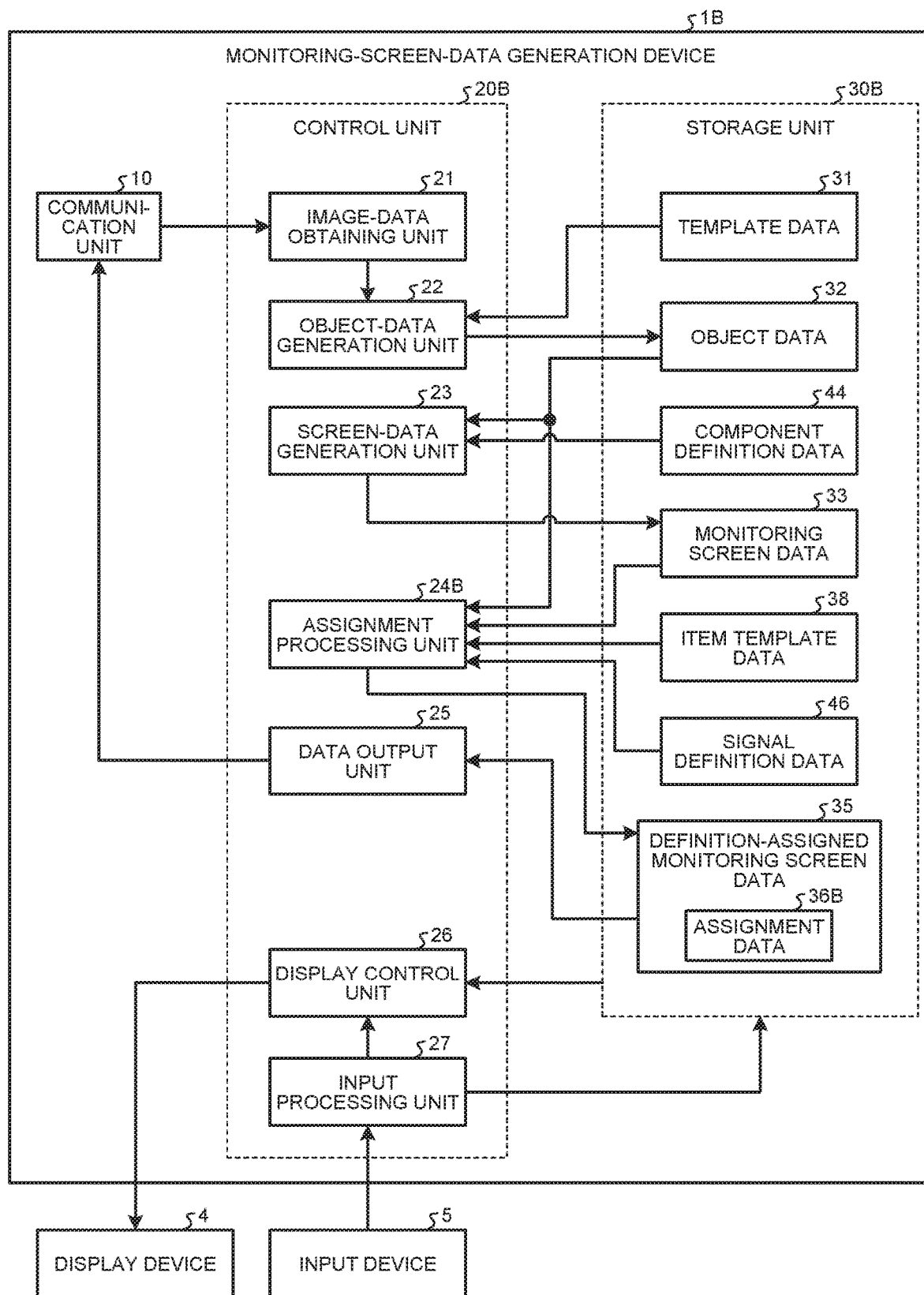
FIG. 19 is a diagram illustrating an example configuration of a monitoring-screen-data generation device according to a third embodiment.

FIG. 19 is a diagram illustrating an example configuration of a monitoring-screen-data generation device 1B according to the third embodiment. As illustrated in FIG. 19, a control unit 20B in the monitoring-screen-data generation device 1B according to the third embodiment includes an assignment processing unit 24B in place of the assignment processing unit 24. A storage unit 30B in the monitoring-screen-data generation device 1B further stores therein item template data 38 and signal definition data 46 in addition to the data stored in the storage unit 30.

The item template data 38 is data in which the symbol type, the signal name, and the behavior are associated with each other. FIG. 20 is a diagram illustrating an example of the item template data 38. In the item template data 38 illustrated in FIG. 20, the signal name "on" and the "behavior 1" are associated with the symbol type "solenoid valve", while the signal name "fault" and the "behavior 2" are associated with the symbol type "solenoid valve".

In the item template data 38, the signal name "on" and the "behavior 3" are associated with the symbol type "pump", while the signal name "flow rate" and the "behavior 4" are associated with the symbol type "pump".

The signal name "on" represents a signal indicating whether the device is in operation or stopped. The "behavior 1" and "behavior 3" associated with the signal name "on" are data indicating a behavior of the symbol in accordance with the signal state. The signal name "fault" represents a signal indicating a device fault. The "behavior 2" associated with the signal name "fault" is data indicating a behavior of the symbol when the device is faulty.

The signal definition data 46 is data in which the device name, the signal name, and the signal code are associated with each other. The signal definition data 46 is stored in the storage unit 30B through the input device 5. In a case where the communication unit 10 receives the signal definition data 46 generated by an external device through the network 2, the control unit 20B can store the signal definition data 46 received by the communication unit 10 in the storage unit 30B.

FIG. 21 is a diagram illustrating an example of the signal definition data 46. In the signal definition data 46 illustrated in FIG. 21, the signal name "on" and the signal code "D11" are associated with the device name "first water pipe valve", while the signal name "fault" and the signal code "D12" are associated with the device name "first water pipe valve". Likewise, the signal name and the signal code are associated with each of the device names "second water pipe valve", "first water pump", and "second water pump".

On the basis of the item template data 38, the signal definition data 46, and the object data 32, the assignment processing unit 24B generates assignment data 36B that defines a state transition for an image object included in a monitoring screen. Specifically, on the basis of the device data 43 and the signal definition data 46, the assignment processing unit 24B generates temporary assignment data in which the signal name and the signal code have been set for each device name included in the device data 43.

More specifically, the assignment processing unit 24B compares the symbol type included in the signal definition data 46 with the symbol type included in the device data 43.

The assignment processing unit 24B then determines a device name associated with the symbol type that matches the symbol type in the signal definition data 46, in the device data 43. For example, the symbol type "solenoid valve", included in the item template data 38 illustrated in FIG. 20, matches the symbol types "solenoid valve 1" and "solenoid valve 2" included in the device data 43 illustrated in FIG. 7. The symbol types "solenoid valve 1" and "solenoid valve 2" are associated with the device names "first water pipe valve" and "second water pipe valve", respectively.

The assignment processing unit 24B extracts, for a device name determined to have a matching symbol type, a signal name and a signal code from the signal definition data 46, the signal name and signal code being associated with the symbol type that matches the device name, and then generates temporary assignment data in which the extracted signal name and signal code are associated with the device name. For example, the temporary assignment data includes data in which the signal name "on" and the signal code "D11" are associated with "first water pipe valve", and includes data in which the signal name "fault" and the signal code "D12" are associated with "first water pipe valve".

Further, on the basis of the item template data 38, the assignment processing unit 24B sets in the temporary assignment data a behavior corresponding to a combination of the device name and the signal type included in the temporary assignment data, and generates the assignment data 36B.

FIG. 22 is a diagram illustrating an example of the assignment data 36B. As illustrated in FIG. 22, in the assignment data 36B, the behavior "behavior 1" is set for the signal name "on" and the behavior "behavior 2" is set for the signal name "fault" with respect to "first water pipe valve" and "second water pipe valve" that are "solenoid valve". In addition, the behavior "behavior 3" is set for the signal name "on" and the behavior "behavior 4" is set for the signal name "flow rate" with respect to "first water pump" and "second water pump" being "pump".

The item template data 38 described above is data in which the symbol name, the signal name, and the behavior are associated with each other. It is also allowable that the item template data 38 is data not associated with the symbol name. FIG. 23 is a diagram illustrating another example of the item template data 38. In the item template data 38 illustrated in FIG. 23, the behavior "behavior 1" is set for the signal name "on", while the behavior "behavior 2" is set for the signal name "fault".

In a case of using the item template data 38 illustrated in FIG. 23, the assignment processing unit 24B assigns a behavior only by the signal name regardless of the symbol name. Thus, in the assignment data 36B, the behavior "behavior 1" is set for the signal name "on" and the behavior "behavior 2" is set for the signal name "fault" with respect to "first water pump" and "second water pump". In the item template data 38 illustrated in FIG. 23, it is also allowable that the behavior "behavior 2" is not set for the signal name "fault" but the behavior "behavior 3" is set for the signal name "flow rate".

Figure 24:
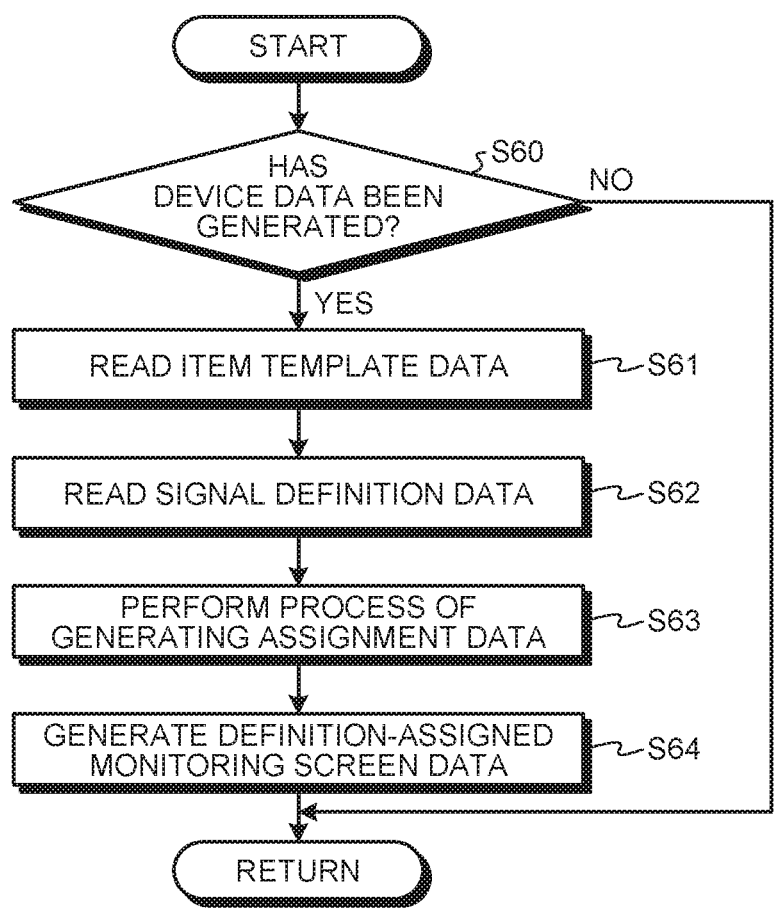
FIG. 24 is a flowchart illustrating an example of processing in a control unit according to the third embodiment.

The processing in the control unit 20B is described below using a flowchart. FIG. 24 is a flowchart illustrating an example of processing in the control unit 20B according to the third embodiment, which corresponds to Step S13 illustrated in FIG. 12.

As illustrated in FIG. 24, the assignment processing unit 24B in the control unit 20B determines whether the device data 43 has been generated in the same manner as in the process at Step S40 (Step S60). When the device data 43 is determined to have been generated (YES at Step S60), the assignment processing unit 24B reads the item template data 38 and the signal definition data 46 from the storage unit 30B (Steps S61 and S62).

The assignment processing unit 24B performs a process of generating the assignment data 36B on the basis of the item template data 38, the signal definition data 46, and the object data 32 (Step S63). The assignment processing unit 24B generates the definition-assigned monitoring screen data 35 that includes the assignment data 36B and the monitoring screen data 33 (Step S64).

An example of the hardware configuration of the monitoring-screen-data generation device 1B according to the third embodiment is identical to the hardware configuration of the monitoring-screen-data generation device 1 illustrated in FIG. 15. The processor 101 reads and executes programs stored in the memory 102 that functions as the storage unit 30B, and can thereby implement the function of the assignment processing unit 24B in place of the assignment processing unit 24.

In the manner as described above, the object-data generation unit 22 in the monitoring-screen-data generation device 1B according to the third embodiment identifies the image object 70, and generates the image object data 41 that includes the type of the identified image object 70. On the basis of the result of comparison between the type of the image object 70 included in the signal definition data 46 and the type of the image object 70 included in the image object data 41, the assignment processing unit 24B assigns the assignment data 36B that defines a state transition to the image object 70 included in a monitoring screen.

Due to this operation, even when there is not the item definition data 45 in which the device name is associated with the behavior, the assignment processing unit 24B can still use the item template data 38 having a simpler definition than the item definition data 45 to assign data that defines a state transition to the image object 70 included in the monitoring screen. This can save time and effort to redefine the behavior of an image object for each monitoring screen, and therefore the definition-assigned monitoring screen data 35 can be easily generated. In a case of using the item template data 38 illustrated in FIG. 23, the assignment processing unit 24B can assign a behavior only by the signal name regardless of the symbol name, and therefore the definition-assigned monitoring screen data 35 can be more easily generated.

When a behavior or a signal code cannot be assigned to an image object on the basis of the item definition data 45, the assignment processing unit 24B can use the item template data 38 to assign a behavior and a signal code to this image object. Due to this operation, even when there is data loss in the item definition data 45, the state transition data can still be assigned to an image object.

Fourth Embodiment

In the first to third embodiments, the monitoring screen data 33 is generated without selecting an object included in the image of the image data 3. A fourth embodiment is different from the first to third embodiments in that a part of the objects is masked to generate the monitoring screen data 33. In the following descriptions, constituent elements having functions identical to those of the first embodiment are denoted by like reference signs and explanations thereof will be omitted, and differences from the monitoring-screen-data generation device 1 according to the first embodiment are mainly explained. However, the fourth embodiment can also be applied to the monitoring-screen-data generation devices 1A and 1B according to the second and third embodiments.

Figure 25:
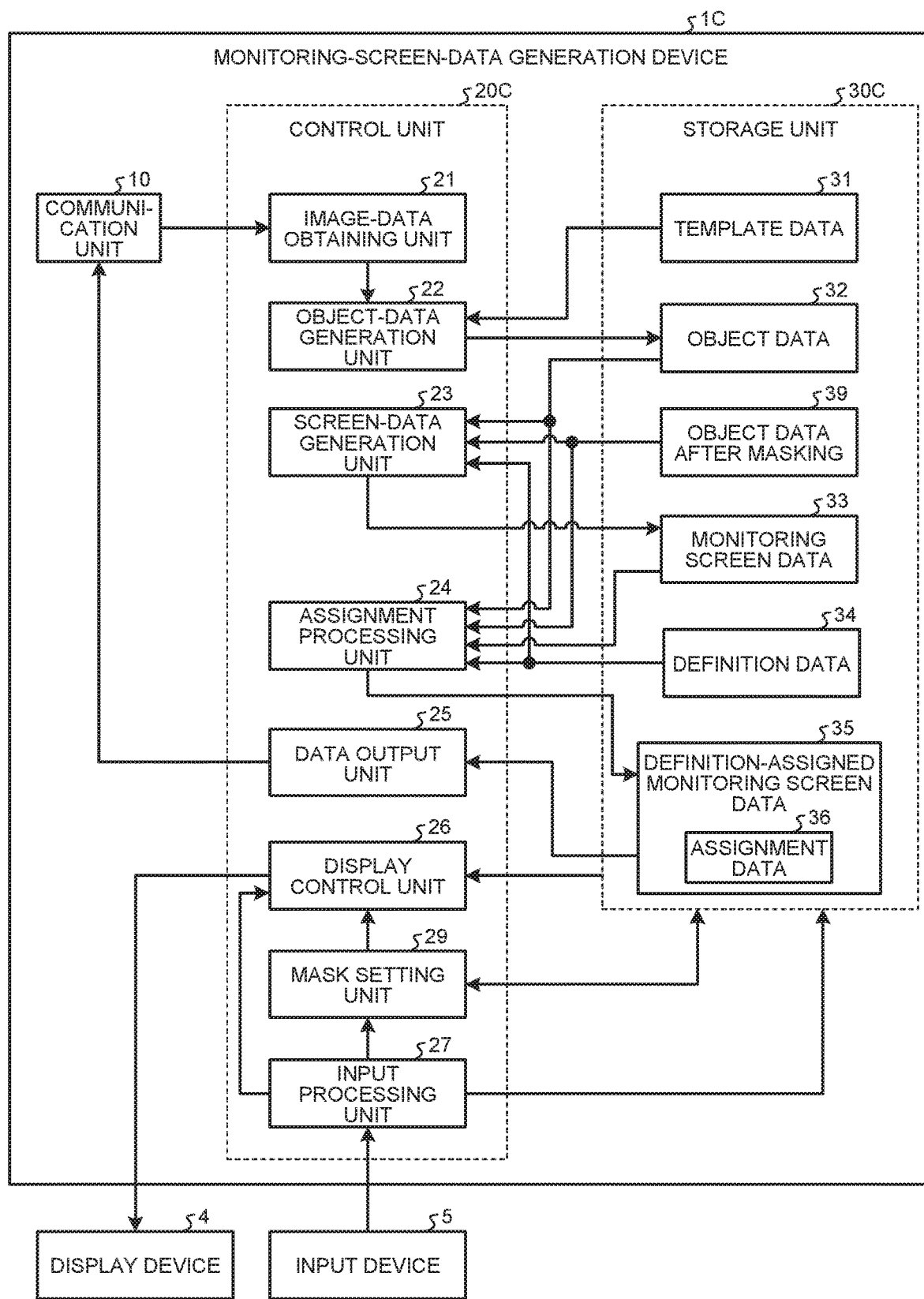
FIG. 25 is a diagram illustrating an example configuration of a monitoring-screen-data generation device according to a fourth embodiment.

As illustrated in FIG. 25, a control unit 20C in a monitoring-screen-data generation device 1C according to the fourth embodiment further includes a mask setting unit 29 in addition to the configuration of the control unit 20. A storage unit 30C in the monitoring-screen-data generation device 1C can store therein object data after masking 39 in addition to the data stored in the storage unit 30.

The mask setting unit 29 reads the object data 32 from the storage unit 30C, generates mask setting screen data on the basis of the object data 32 having been read, and outputs the mask setting screen data to the display control unit 26. On the basis of the mask setting screen data, the display control unit 26 displays a mask setting screen on the display device 4.

FIG. 26 is a diagram illustrating an example of the mask setting screen displayed on the display device 4. On a mask setting screen 69 illustrated in FIG. 26, check boxes 73a to 73f are placed for individual symbol components that are image objects, and check boxes 74a to 74e are placed for individual line components that are image objects. On the mask setting screen 69, check boxes 75a to 75f are placed for individual character strings that are character objects.

When a setting button 76 provided on the mask setting screen 69 is operated through the input device 5, the mask setting unit 29 generates the object data after masking 39 that excludes an object for which any of the check boxes 73a to 73f, 74a to 74e, and 75a to 75f, on which a check operation has been performed through the input device 5, is set. The mask setting unit 29 stores the generated object data after masking 39 in the storage unit 30C.

As illustrated in FIG. 26, when the setting button 76 is operated after a check operation has been performed on the check boxes 73e and 73f, the mask setting unit 29 performs mask setting on image objects corresponding to the symbol type "right-side outlet pump 2" and "numerical-value button 2". Due to this operation, the object data after masking 39 is generated in which the image objects corresponding to the symbol type "right-side outlet pump 2" and "numerical-value button 2" have been excluded from the object data 32.

When a cancel button 77 provided on the mask setting screen 69 is operated through the input device 5, the mask setting unit 29 deletes the object data after masking 39 stored in the storage unit 30C.

The processing in the control unit 20C is described below using a flowchart. FIG. 27 is a flowchart illustrating an example of processing in the control unit 20C according to the fourth embodiment. Processes at Steps S70, S71, S76, and S77 illustrated in FIG. 27 are the same processes at Steps S50, S51, S56, and S57 illustrated in FIG. 18, and explanations thereof will be omitted in the following descriptions.

As illustrated in FIG. 27, at Step S72, the mask setting unit 29 in the control unit 20C generates mask setting screen data on the basis of the object data 32, while the display control unit 26 displays the mask setting screen on the display device 4 on the basis of the mask setting screen data.

Next, the mask setting unit 29 determines whether there is a request for mask setting (Step S73). When the setting button 76 described above is operated, the mask setting unit 29 determines that there is a request for mask setting. When the mask setting unit 29 determines that there is a request for mask setting (YES at Step S73), the mask setting unit 29 generates the object data after masking 39 in which an object having undergone mask setting has been excluded (Step S74).

Subsequently, the screen-data generation unit 23 in the control unit 20C generates the monitoring screen data 33 that is data of a monitoring screen on the basis of the object data after masking 39 generated at Step S74 and the component definition data 44 (Step S75). The control unit 20C performs the same process as at Step S31 to generate the device data 43 on the basis of the object data after masking 39 (Step S76).

In the example described above, an object to be excluded is selected. However, the mask setting unit 29 can also generate the object data after masking 39 in which an object other than the selected object has been excluded. In the example described above, the mask setting unit 29 generates the object data after masking 39 in which a part of the objects has been excluded on the basis of an operation on a check box. However, a part of the objects can also be excluded by any method other than using the check box. After the monitoring screen data 33 is generated, the mask setting unit 29 can also generate the object data after masking 39 in which an object selected from the image of the monitoring screen data 33 has been excluded.

An example of the hardware configuration of the monitoring-screen-data generation device 1C according to the fourth embodiment is identical to the hardware configuration of the monitoring-screen-data generation device 1 illustrated in FIG. 15. The processor 101 reads and executes programs stored in the memory 102 that functions as the storage unit 30C, and can thereby implement the function of the mask setting unit 29 in addition to the functions of the control unit 20 described above.

As described above, the monitoring-screen-data generation device 1C according to the fourth embodiment includes the mask setting unit 29 that is an example of the data changing unit. The mask setting unit 29 generates the object data after masking 39 in which a part of a plurality of objects 70a to 70f, 71a to 71e, and 72a to 72f (see FIG. 4) has been excluded from the object data 32. On the basis of the object data after masking 39 generated by the mask setting unit 29, the screen-data generation unit 23 generates the monitoring screen data 33 in which the part of the objects has been excluded. Due to this operation, the monitoring screen data 33 in which unnecessary objects have been excluded can be easily generated.

Fifth Embodiment

A fifth embodiment is different from the first to fourth embodiments in that an additional function is further provided. With this additional function, the monitoring screen data 33 is generated in which objects included in images of plural types of image data 3 are placed on a single monitoring screen. In the following descriptions, constituent elements having functions identical to those of the first embodiment are denoted by like reference signs and explanations thereof will be omitted, and differences from the monitoring-screen-data generation device 1 according to the first embodiment are mainly explained. However, the fifth embodiment can also be applied to the monitoring-screen-data generation devices 1A to 1C according to the second to fourth embodiments.

Figure 28:
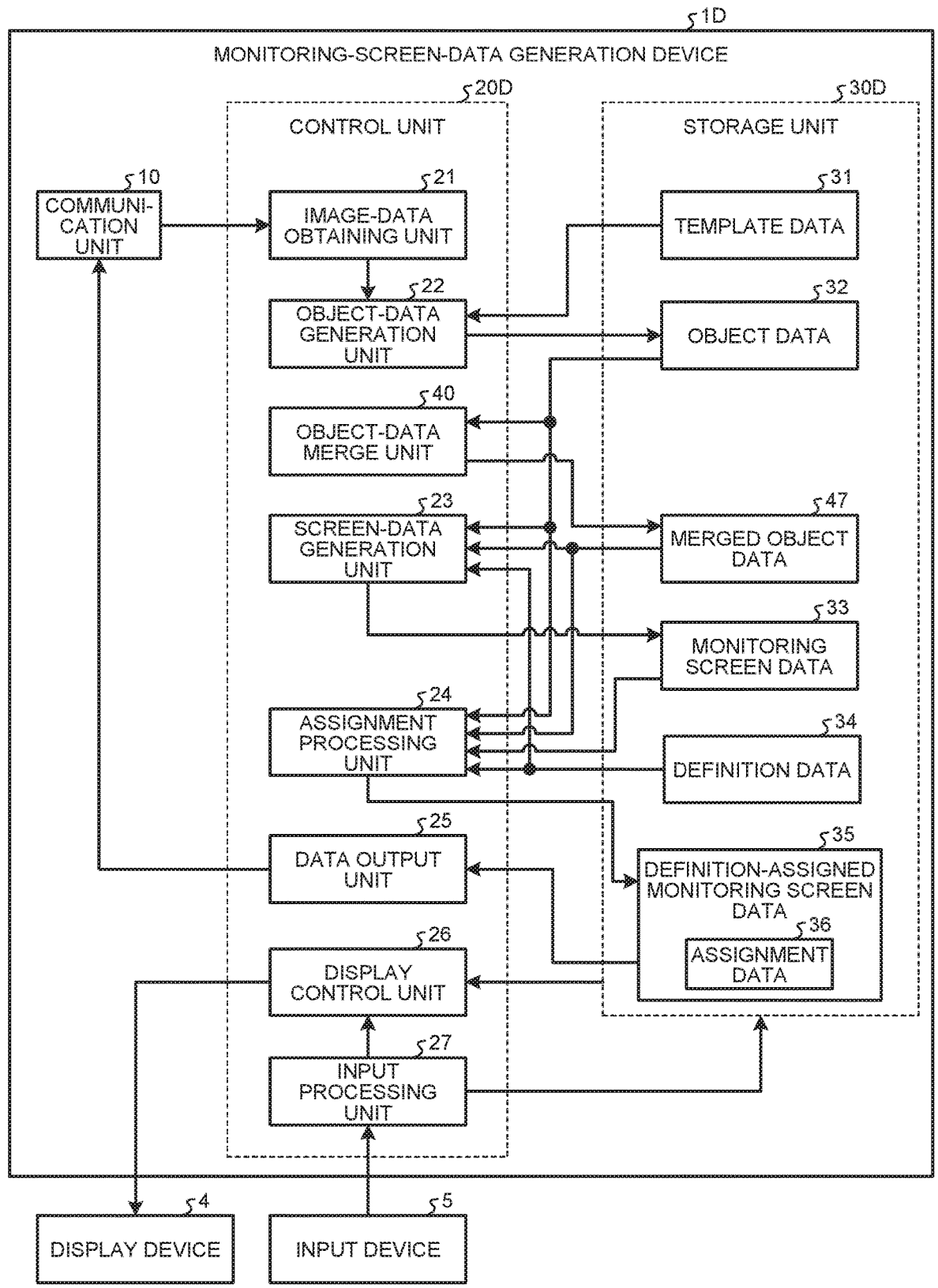
FIG. 28 is a diagram illustrating an example configuration of a monitoring-screen-data generation device according to a fifth embodiment.

FIG. 28 is a diagram illustrating an example configuration of a monitoring-screen-data generation device 1D according to the fifth embodiment. As illustrated in FIG. 28, a control unit 20D in the monitoring-screen-data generation device 1D according to the fifth embodiment includes an object-data merge unit 40 in addition to the configuration of the control unit 20. A storage unit 30D in the monitoring-screendata generation device 1D can further store therein merged object data 47 in addition to the data stored in the storage unit 30.

Figure 29:
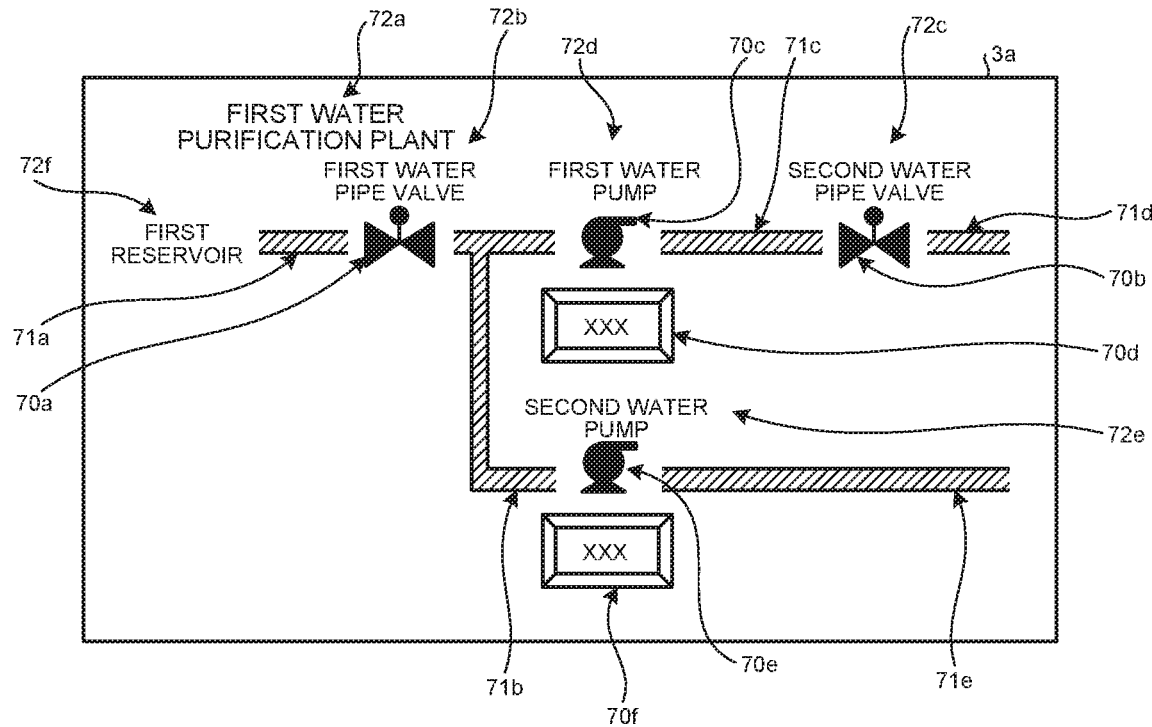
FIG. 29 is a diagram illustrating an example of first image data obtained by an image-data obtaining unit according to the fifth embodiment.
Figure 30:
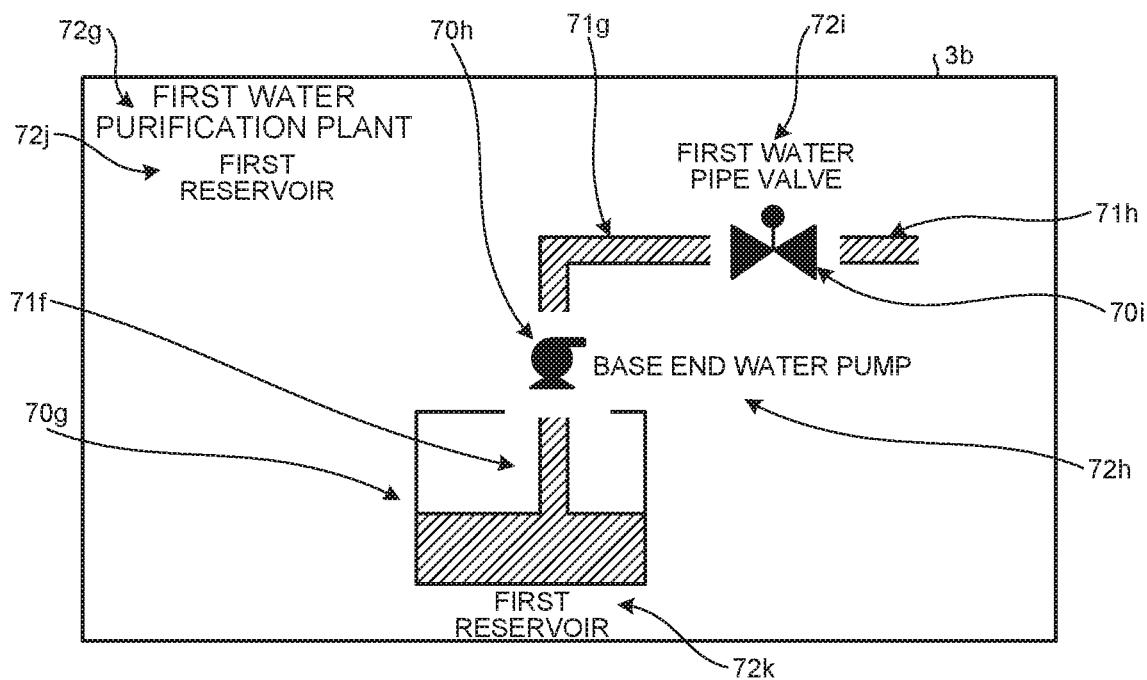
FIG. 30 is a diagram illustrating an example of second image data obtained by the image-data obtaining unit according to the fifth embodiment.

It is assumed that the image-data obtaining unit 21 in the control unit 20D obtains first image data 3a of an image illustrated in FIG. 29 and second image data 3b of an image illustrated in FIG. 30. FIG. 29 and FIG. 30 are diagrams illustrating an example of the image data obtained by the image-data obtaining unit 21. The first image data 3a illustrated in FIG. 29 is identical to the image data 3 illustrated in FIG. 4.

The image of the image data 3b illustrated in FIG. 30 includes image objects 70g to 70i that are symbol components, image objects 71f to 71h that are line components, and character objects 72g to 72k that are character strings.

The object-data generation unit 22 generates the object data 32 that includes object data of the first image data 3a and object data of the second image data 3b. In the following descriptions, the object data of the first image data 3a is referred to as "object data 32a", and the object data of the second image data 3b is referred to as "object data 32b".

The object data 32a includes image object data 41a, character object data 42a, and device data 43a. The image object data 41a is identical to the image object data 41 described above. The character object data 42a is identical to the character object data 42 described above. The device data 43a is identical to the device data 43 described above.

The object data 32b includes image object data 41b, character object data 42b, and device data 43b. The image object data 41b includes record data of each of the image objects 70g to 70i and record data of each of the image objects 71f to 71h. The record data of each of the image objects 70g to 70i includes data indicating the symbol type, the coordinates, and the size. The record data of each of the image objects 71f to 71h includes data indicating the line type, the coordinates, and the size.

The character object data 42b includes record data of each of the character objects 72g to 72k. The device data 43b includes record data of each of the image objects 70g to 70i.

The object-data merge unit 40 performs a process of merging the object data 32a and the object data 32b respectively generated from the image data 3a and the image data 3b to generate the merged object data 47, and stores the generated merged object data 47 in the storage unit 30D.

FIG. 31 and FIG. 32 are explanatory diagrams illustrating merging of the object data 32a with the object data 32b. As illustrated in FIG. 31, in the merging process, the object-data merge unit 40 merges the character object data 42a and the character object data 42b into a single piece of character object data 42c.

The object-data merge unit 40 retrieves a character string that matches between the character object data 42a and the character object data 42b, and performs the merging process by relatively changing a part of the coordinates with reference to the matching character string obtained by the retrieval. In a case where there are a plurality of character strings that match between the character object data 42a and the character object data 42b, the object-data merge unit 40 performs the merging process using, among the plurality of character strings, a character string that matches a device name common between the device data 43a and the device data 43b as a reference.

In the example illustrated in FIG. 31, the device name "first water pipe valve" is common between the character object data 42a and the character object data 42b. With reference to the coordinates of the character string "first water pipe valve" in the character object data 42a, the object-data merge unit 40 changes the coordinates of the character string "first water pipe valve" in the character object data 42b.

Specifically, the object-data merge unit 40 shifts the coordinates of the character string "first water pipe valve" in the character object data 42b to the coordinates of the character string "first water pipe valve" in the character object data 42a. The object-data merge unit 40 also shifts the coordinates of character strings other than the character string "first water pipe valve" in the character object data 42b by a shift amount equal to that of the coordinates of the character string "first water pipe valve" so as to change the coordinates of each record data included in the character object data 42b.

In the example illustrated in FIG. 31, the shift amount is "−190, 0".

The object-data merge unit 40 deletes record data with a character string that overlaps with the character string in the character object data 42a, among the character strings in the character object data 42b whose coordinates have been changed, and merges the character object data 42a with the character object data 42b. Due to this operation, the character object data 42c illustrated in FIG. 31 is generated.

As illustrated in FIG. 32, the object-data merge unit 40 performs the merging process of merging the device data 43a and the device data 43b into a single piece of device data 43c. In the merging process, the object-data merge unit 40 retrieves a device name that matches between the device data 43a and the device data 43b to perform the merging process with reference to the matching device name obtained by the retrieval. In a case where there are a plurality of device names that match between the device data 43a and the device data 43b, the object-data merge unit 40 performs the merging process with reference to one of the matching device names.

In an example illustrated in FIG. 32, the device name "first water pipe valve" is common between the device data 43a and the device data 43b. The object-data merge unit 40 changes the coordinates of each record data included in the device data 43b with reference to the coordinates of the device name "first water pipe valve" in the device data 43a.

Specifically, the object-data merge unit 40 shifts the coordinates of the device name "first water pipe valve" in the device data 43b to the coordinates of the device name "first water pipe valve" in the device data 43a. The object-data merge unit 40 also shifts the coordinates of character strings other than the device name "first water pipe valve" in the device data 43b by a shift amount equal to that of the coordinates of the device name "first water pipe valve" so as to change the coordinates of each record data included in the device data 43b. In the example illustrated in FIG. 32, the shift amount is "−190, 0".

The object-data merge unit 40 deletes record data with a device name that overlaps with the device name in the device data 43a, among the record data in the device data 43b whose coordinates have been changed, and merges the device data 43a with the device data 43b. Due to this operation, the device data 43c illustrated in FIG. 32 is generated.

In the example described above, the object-data merge unit 40 performs the merging process with reference to a device name that matches between the device data 43a and the device data 43b. The object-data merge unit 40 can also perform the merging process with reference to a combination of a device name and a symbol type that matches between the device data 43a and the device data 43b.

Next, the object-data merge unit 40 generates the merged object data 47 by performing a process of correcting the coordinates and the size of each object such that the objects 70*a* to 70*i*, 71*a* to 71*h*, and 72*a* to 72*k* defined in the character object data 42*c* and the device data 43*c* can be displayed on a single monitoring screen. The correction process can be performed by scaling down and shifting the area of the coordinates of the objects 70*a* to 70*i*, 71*a* to 71*h*, and 72*a* to 72*k*. The object-data merge unit 40 stores the generated merged object data 47 in the storage unit 30D. The merged object data 47 includes character object data 92 and device data 93.

FIG. 33 is a diagram illustrating an example of the character object data 92 included in the merged object data 47. FIG. 34 is a diagram illustrating an example of the device data 93 included in the merged object data 47.

As illustrated in FIG. 33, the coordinates of each character object in the character object data 42*c* have been changed to the coordinates of each character object in the character object data 92 so that the character objects can be displayed on a single monitoring screen. While in the example illustrated in FIG. 33, the size of each character object remains unchanged, the object-data merge unit 40 can change the size of each character object.

Specifically, in the merged object data 47, the size of a character object can be changed by using the reduction rate that is equal to that of the image object. Due to this operation, each object can be scaled down by the reduction rate same as the image data 3*a* and 3*b*. In the merged object data 47, the reduction rate of the size of a character object can be made smaller than that of the image object. This can prevent a character object from becoming excessively small. The merged object data 47 can limit the size of a character object so as not to become smaller than the lower-limit value.

As illustrated in FIG. 34, the coordinates and the size of each symbol type in the device data 43*c* have been changed to the coordinates and the size of each symbol type in the device data 93 so that the image objects can be displayed on a single monitoring screen.

Figure 35:
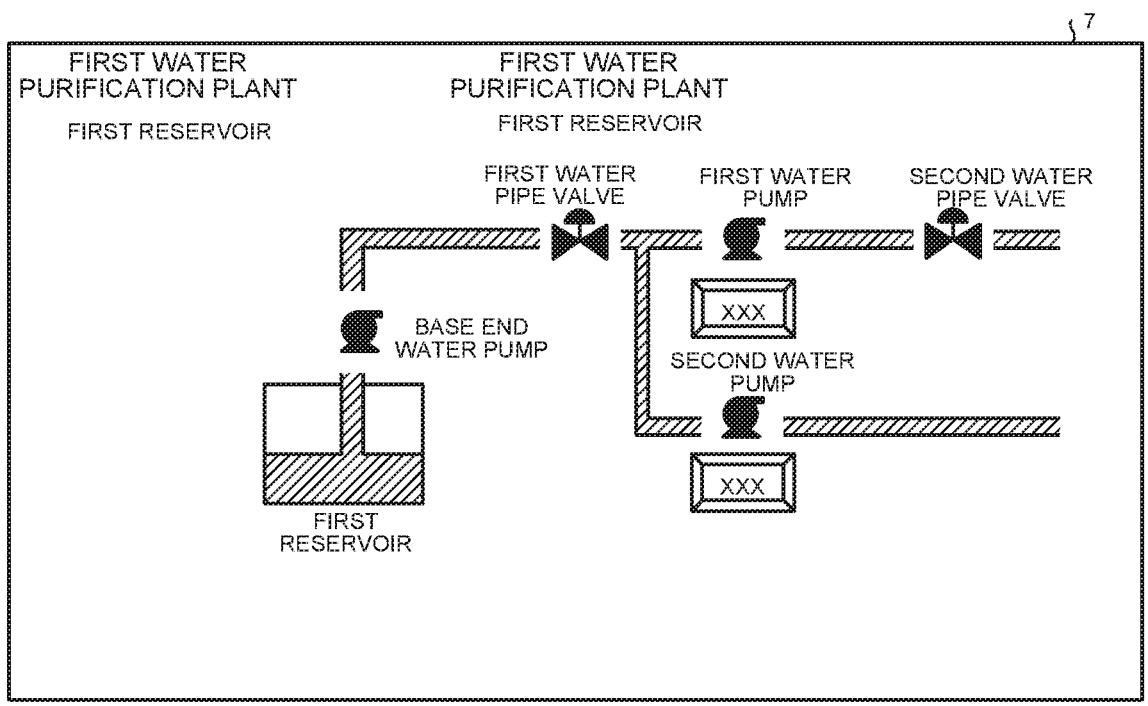
FIG. 35 is a diagram illustrating an example of a monitoring screen according to the fifth embodiment.

The screen-data generation unit 23 generates the monitoring screen data 33 on the basis of the merged object data 47. FIG. 35 is a diagram illustrating an example of a monitoring screen 7 displayed on the display device 4 using the monitoring screen data 33 generated by the screen-data generation unit 23 on the basis of the merged object data 47. As illustrated in FIG. 35, the monitoring screen 7 includes an image obtained by merging the image illustrated in FIG. 29 with the image illustrated in FIG. 30 into a single screen.

The assignment processing unit 24 generates the definition-assigned monitoring screen data 35 on the basis of the definition data 34 that defines a state transition and the device data 93 in the merged object data 47. The definition-assigned monitoring screen data 35 is data including the monitoring screen data 33 and the assignment data 36 that defines a state transition for an image object included in a monitoring screen.

Figure 36:
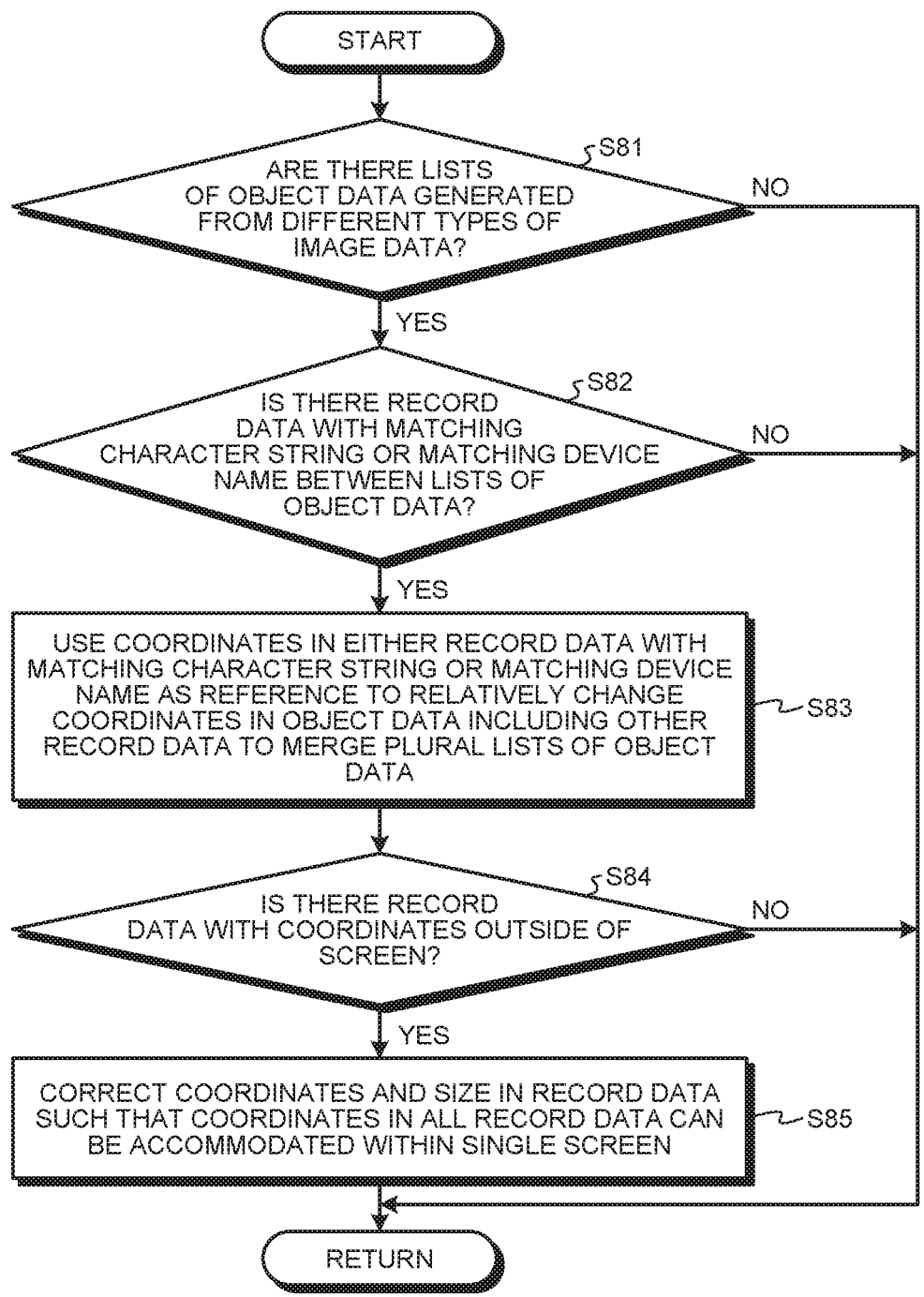
FIG. 36 is a flowchart illustrating an example of processing in a control unit according to the fifth embodiment.

The processing in the control unit 20D is described below using a flowchart. FIG. 36 is a flowchart illustrating an example of processing in the control unit 20D according to the fifth embodiment and illustrating processes to be performed between Step S11 and Step S12 in FIG. 12, between Step S51 and Step S52 in FIG. 18, or between Step S71 and Step S72 in FIG. 27.

As illustrated in FIG. 36, at Step S81, the object-data merge unit 40 in the control unit 20D determines whether there are pieces of object data generated from different types of image data (Step S81). At Step S81, when the object data 32 stored in the storage unit 30D includes pieces of object data generated from different types of image data, the object-data merge unit 40 determines that there are pieces of object data generated from different types of image data. Whether pieces of object data are generated from different types of image data is determined by the matching rate of the pieces of object data.

When it is determined that there are pieces of object data generated from different types of image data (YES at Step S81), the object-data merge unit 40 determines whether there is record data having a character string or a device name that matches between different pieces of object data (Step S82). In a process at Step S82, the object-data merge unit 40 determines whether there is a character string that matches between pieces of character object data obtained from different types of image data. The object-data merge unit 40 determines whether there is a device name that matches between pieces of device data obtained from the different types of image data.

When it is determined that there is record data having a character string or a device name that matches between different pieces of object data (YES at Step S82), the object-data merge unit 40 uses the coordinates in either record data having a matching character string or a matching device name as a reference to relatively change the coordinates in object data including the other record data to merge plural pieces of object data (Step S83).

In a process at Step S83, for example, the object-data merge unit 40 merges plural pieces of character object data 42*a* and 42*b* to generate the character object data 42*c* as illustrated in FIG. 31, while merging plural pieces of device data 43*a* and 43*b* to generate the device data 43*c* as illustrated in FIG. 32.

Next, the object-data merge unit 40 determines whether there is record data having the coordinates outside the screen (Step S84). When the object-data merge unit 40 determines that there is record data having the coordinates outside the screen (YES at Step S84), the object-data merge unit 40 corrects the coordinates and the size in the record data such that the coordinates in all the record data can be accommodated within a single screen (Step S85).

In a process at Step S85, for example, the object-data merge unit 40 can correct the character object data 42*c* illustrated in FIG. 31 to generate the character object data 92 illustrated in FIG. 33, and can also correct the device data 43*c* illustrated in FIG. 32 to generate the device data 93 illustrated in FIG. 34.

When the process at Step S85 is ended, when it is determined that there are not pieces of object data generated from different types of image data (NO at Step S81), when it is determined that there is not matching record data (NO at Step S82), or when it is determined that there is not record data having the coordinates outside the screen (NO at Step S84), the object-data merge unit 40 ends processes illustrated in FIG. 36.

The assignment processing unit 24 can also change the behavior to be assigned to an image object in accordance with the size of the image object in the same manner as performed by the assignment processing unit 24B. Due to this operation, even when the size of the image object is so small that it is difficult to visually recognize the behavior of the image object, it is possible to assign a more visible behavior to the image object.

The object-data merge unit 40 can also generate the merged object data 47 within a range where the size of the object becomes greater than a threshold. This can prevent generation of the monitoring screen data 33 with an excessively small object.

An example of the hardware configuration of the monitoring-screen-data generation device 1D according to the fifth embodiment is identical to the hardware configuration of the monitoring-screen-data generation device 1 illustrated in FIG. 15. The processor 101 reads and executes programs stored in the memory 102 that functions as the storage unit 30D, and can thereby implement the function of the object-data merge unit 40 in addition to the functions of the control unit 20 described above.

As described above, the monitoring-screen-data generation device 1D according to the fifth embodiment includes the object-data merge unit 40. The object-data merge unit 40 merges the object data 32a and the object data 32b which are generated from plural types of image data obtained by the image-data obtaining unit 21. On the basis of the merged object data 47 merged by the object-data merge unit 40, the screen-data generation unit 23 generates the monitoring screen data 33 that is data of a single monitoring screen. Due to this operation, the screen-data generation unit 23 can generate the monitoring screen data 33 that is data of a single monitoring screen easily from plural types of image data.

The configurations described in the above embodiments are only examples of the content of the present invention. The configurations can be combined with other well-known techniques, and a part of each of the configurations can be omitted or modified without departing from the scope of the present invention.

REFERENCE SIGNS LIST 1, 1A to 1D monitoring-screen-data generation device, 2 network, 4 display device, 5 input device, 10 communication unit, 20, 20A to 20D control unit, 21 image-data obtaining unit, 22 object-data generation unit, screen-data generation unit, 23B, 30, 30A to 30D storage unit, 24, 24B assignment processing unit, 25 data output unit, 26 display control unit, 27 input processing unit, 28 scaling processing unit, 29 mask setting unit, template data, 32, 32a, 32b object data, 33 monitoring screen data, 34 definition data, 35 definition-assigned monitoring screen data, 36, 36B assignment data, 37 corrected object data, 38 item template data, 39 object data after masking, 40 object-data merge unit, 41, 41a, 41b image object data, 42, 42a to 42c character object data, 43, 43a to 43c device data, component definition data, 45 item definition data, 46 signal definition data, 47 merged object data, 51 template-matching processing unit, 52 character-identification processing unit, 53 device-data generation unit.

The invention claimed is:

1. A monitoring-screen-data generation device comprising:
an image-data obtainer to obtain image data that is data of an image;
an object-data generator to identify a plurality of objects included in the image of the image data obtained by the image-data obtainer, determine, by analyzing each object of the image using image recognition, a position of each object of the plurality of objects, and to generate object data that includes information on the objects identified, wherein the information comprises the determined position for each object;
a screen-data generator to generate monitoring screen data on a basis of the object data generated by the object-data generator, the monitoring screen data being data of a monitoring screen including an image object that is an object of an image whose position among the objects is based on the determined position for the object; and
an assignment processor to, on a basis of definition data that defines a state transition and the object data, assign data that defines the state transition to the image object included in a monitoring screen of the monitoring screen data, wherein
the definition data includes data in which a device name is associated with the state transition,
the object-data generator includes
a first identifier to identify the image object among the objects, and to generate image object data that includes coordinates of the image object identified,
a second identifier to identify a character object that is an object of a character among the objects, and to generate character object data that includes coordinates and a character string of the character object identified, and
a device-data generator to generate device data in which the image object is associated with the character object on a basis of coordinates of the image object and coordinates of the character object, and
on a basis of a result of comparison between the device name included in the definition data and the character string included in the device data, the assignment processor assigns data that defines the state transition to the image object included in the monitoring screen.

2. The monitoring-screen-data generation device according to claim 1, wherein
the definition data includes data in which a type of the image object is associated with the state transition,
the object-data generator identifies the image object and generates image object data that includes a type of the image object identified, and
on a basis of a result of comparison between a type of the image object included in the definition data and a type of the image object included in the image object data, the assignment processor assigns data that defines the state transition to the image object included in the monitoring screen.

3. The monitoring-screen-data generation device according to claim 1, comprising a size changer to change a size of the object included in the object data, wherein
the screen-data generator generates the monitoring screen data on a basis of the object data that includes data of the object whose size is changed by the size changer.

4. The monitoring-screen-data generation device according to claim 1, comprising a data changer to generate object data in which information on a part of the objects is excluded from the object data, wherein
on a basis of the object data generated by the data changer, the screen-data generator generates monitoring screen data in which information on the part of the objects excluded.

5. The monitoring-screen-data generation device according to claim 1, comprising an object-data combiner to merge the object data generated from plural types of image data obtained by the image-data obtainer, wherein
on a basis of object data merged by the object-data combiner, the screen-data generator generates monitoring screen data that is data of a single monitoring screen.

6. The monitoring-screen-data generation device according to claim 1, wherein
the image object indicates a monitoring-target device, and the state transition includes at least one of a behavior of the image object in response to a signal received from the monitoring-target device and a behavior of the image object when an operation is performed on the image object.

7. The monitoring-screen-data generation device according to claim 6, wherein the behavior includes at least one of a change in condition of the image object and a display of a device operation screen that is a screen used for operating a device that inputs or outputs a signal assigned to the image object.

8. The monitoring-screen-data generation device according to claim 1, wherein
the object-data generator determines whether a distance between the coordinates of the image object and the coordinates of the character object falls within a set range, and
when the distance falls within the set range, the object-data generator generates the device data.

9. A monitoring-screen-data generation method comprising:
obtaining image data that is data of an image;
identifying a plurality of objects included in the image of the obtained image data,
determining, by analyzing each object of the image using image recognition, a position of each object of the plurality of objects;
generating object data that includes information on the objects identified, wherein the information comprises the determined position for each object;
generating monitoring screen data on a basis of the generated object data, the monitoring screen data being data of a monitoring screen including an image object that is an object of an image whose position among the objects is based on the determined position for the object; and
on a basis of definition data that defines a state transition and the object data, assigning data that defines the state transition to the image object included in the monitoring screen wherein
the definition data includes data in which a device name is associated with the state transition,
the generating object data includes
identifying the image object among the objects, and generating image object data that includes coordinates of the image object identified,
identifying a character object that is an object of a character among the objects, and generating character object data that includes coordinates and a character string of the character object identified, and
generating device data in which the image object is associated with the character object on a basis of coordinates of the image object and coordinates of the character object, and
on a basis of a result of comparison between the device name included in the definition data and the character string included in the device data, the assigning includes assigning data that defines the state transition to the image object included in the monitoring screen.

10. A non-transitory computer-readable recording medium that stores therein a monitoring-screen-data generation program causing a computer to execute:
obtaining image data that is data of an image;
identifying a plurality of objects included in the image of the obtained image data,
determining, by analyzing each object of the image using image recognition, a position of each object of the plurality of objects;
generating object data that includes information on the objects identified, wherein the information comprises the determined position for each object;
generating monitoring screen data on a basis of the generated object data, the monitoring screen data being data of a monitoring screen including an image object that is an object of an image whose position among the objects is based on the determined position for the object; and
on a basis of definition data that defines a state transition and the object data, assigning data that defines the state transition to the image object included in the monitoring screen wherein
the definition data includes data in which a device name is associated with the state transition,
the generating object data includes
identifying the image object among the objects, and generating image object data that includes coordinates of the image object identified,
identifying a character object that is an object of a character among the objects, and generating character object data that includes coordinates and a character string of the character object identified, and
generating device data in which the image object is associated with the character object on a basis of coordinates of the image object and coordinates of the character object, and
on a basis of a result of comparison between the device name included in the definition data and the character string included in the device data, the assigning includes assigning data that defines the state transition to the image object included in the monitoring screen.

* * * * *